US011965520B2

(12) United States Patent
Cho et al.

(10) Patent No.: US 11,965,520 B2
(45) Date of Patent: Apr. 23, 2024

(54) AIRFOIL JOURNAL BEARING

(71) Applicants: Samsung Electronics Co., Ltd., Suwon-si (KR); NEUROS CO., LTD., Daejeon (KR)

(72) Inventors: Jinwoo Cho, Suwon-si (KR); Woong Hwang, Suwon-si (KR); Kyeongdong Kim, Sejong (KR)

(73) Assignees: SAMSUNG ELECTRONICS CO., LTD., Suwon-si (KR); NEUROS CO., LTD., Yuseong-Gu (KR)

( * ) Notice: Subject to any disclaimer, the term of this patent is extended or adjusted under 35 U.S.C. 154(b) by 0 days.

(21) Appl. No.: 18/091,841

(22) Filed: Dec. 30, 2022

(65) Prior Publication Data

US 2023/0160392 A1 May 25, 2023

Related U.S. Application Data

(63) Continuation of application No. PCT/KR2022/014782, filed on Sep. 30, 2022.

(30) Foreign Application Priority Data

Nov. 23, 2021 (KR) ........................ 10-2021-0162428

(51) Int. Cl.
*F04D 29/057* (2006.01)

(52) U.S. Cl.
CPC ........ *F04D 29/057* (2013.01); *F05D 2240/53* (2013.01)

(58) Field of Classification Search
CPC .. F04D 29/057; F05D 2240/53; F16C 17/024; F16C 27/02; F02C 17/042; F04C 2240/54
See application file for complete search history.

(56) References Cited

U.S. PATENT DOCUMENTS 5,634,723 A * 6/1997 Agrawal ............... F16C 17/024 384/106
5,714,818 A 2/1998 Eakman et al.
(Continued)

FOREIGN PATENT DOCUMENTS

JP 3233840 12/2001
JP 5253866 7/2013
(Continued)

OTHER PUBLICATIONS

International Search Report, PCT/ISA/210, dated Jan. 12, 2023, in PCT/KR2022/014782.

*Primary Examiner* — Eldon T Brockman
(74) *Attorney, Agent, or Firm* — STAAS & HALSEY LLP

(57) ABSTRACT

An airfoil journal bearing including a bearing housing having an inner surface forming a hollow so that a rotation shaft is insertable in the hollow; an airfoil in the hollow so that, when the rotation shaft is inserted in the hollow, the airfoil encloses at least 180 to 360 degrees of a circumference of the rotation shaft; and a ring member enclosing an outer surface of the bearing housing. The bearing housing includes an insert slit formed through the bearing housing from the inner surface of the bearing housing to the outer surface of the bearing housing. The airfoil includes an insert part bent from a circumferential direction of the airfoil to a radial direction of the bearing housing and extending, through the insert slit, to the outer surface of the bearing housing. The airfoil is engaged with an outer surface of the ring member through the insert part.

20 Claims, 16 Drawing Sheets

(56) References Cited

U.S. PATENT DOCUMENTS

| | | | | |
|---|---|---|---|---|
| 6,811,315 | B2 | 11/2004 | Fournier et al. | |
| 7,648,280 | B2 | 1/2010 | Struziak et al. | |
| 11,739,761 | B2 * | 8/2023 | Okano | F04D 29/057 415/103 |
| 2022/0099102 | A1 * | 3/2022 | Okano | F16C 17/042 |

FOREIGN PATENT DOCUMENTS

| | | |
|---|---|---|
| JP | 2017-194117 | 10/2017 |
| JP | 2018-28387 | 2/2018 |
| KR | 10-2019-0021541 | 3/2019 |
| KR | 10-1980564 | 5/2019 |
| KR | 10-2230226 | 3/2021 |

* cited by examiner

AIRFOIL JOURNAL BEARING

CROSS-REFERENCE TO RELATED APPLICATIONS

This application is a continuation of International Application No. PCT/KR2022/014782 designating the United States, filed on Sep. 30, 2022, in the Korean Intellectual Property Receiving Office and claiming priority to Korean Patent Application No. 10-2021-0162428, filed on Nov. 23, 2021, in the Korean Intellectual Property Office, the disclosures of which are incorporated by reference herein in their entireties.

BACKGROUND

1. Field

The disclosure relates to an airfoil journal bearing.

2. Description of Related Art

A bearing may fix a rotation shaft in a predetermined position and rotate the rotation shaft while supporting a load generated by rotation of the rotation shaft. There are various types of bearings, such as a ball bearing, a journal bearing, a foil bearing, and the like. An airfoil journal bearing may support a load in a radial direction perpendicular to an axis direction of the rotation shaft.

SUMMARY

According to an example embodiment of the present disclosure, an airfoil journal bearing may include a bearing housing having an inner surface forming a hollow through the bearing housing so that a rotation shaft is insertable in the hollow and so that, when the rotation shaft is inserted in the hollow, an axial direction of the airfoil journal bearing is the same as a longitudinal direction of the rotation shaft and the hollow longitudinally extends in the axial direction; an airfoil in the hollow and extending in a circumferential direction of the hollow so that, when the rotation shaft is inserted in the hollow, the airfoil encloses at least 180 to 360 degrees of a circumference of the rotation shaft, and a ring member that is annular and is connected to the bearing housing, and enclosing an outer surface of the bearing housing in a circumferential direction of the bearing housing. The bearing housing may include, based on a cross-section perpendicular to the axial direction, an insert slit formed through the bearing housing in a radial direction of the bearing housing from the inner surface of the bearing housing forming the hollow to the outer surface of the bearing housing. The airfoil may include, based on a cross-section perpendicular to the axial direction, an insert part bent from a circumferential direction of the airfoil to the radial direction of the bearing housing and extending, through the insert slit, to the outer surface of the bearing housing. The airfoil may be engaged with an outer surface of the ring member through the insert part.

According to an example embodiment of the present disclosure, the airfoil may including an engagement part formed at an edge of the insert part extending to the outer surface of the bearing housing and being concave so that at least some of the outer surface of the ring member is inserted into the engagement part.

According to an example embodiment of the present disclosure, a plurality of ring members may be connected to the outer surface of the bearing housing, and a plurality of the engagement parts may be at the edge of the insert part, wherein the plurality of engagement parts may be respectively connected to the plurality of ring members.

According to an example embodiments of the present disclosure, the insert slit may be in the axial direction, and the ring members may be spaced apart from one another in the axial direction.

According to an example embodiments of the present disclosure, the bearing housing may include a seating groove formed in the outer surface of the bearing housing in the circumferential direction of the bearing housing and where the ring member sits.

According to an example embodiments of the present disclosure, the airfoil may include a first foil extending along the inner surface of the bearing housing forming the hollow in the circumferential direction of the hollow, and a second foil extending along the inner surface of the bearing housing forming the hollow from the first foil in the circumferential direction of the hollow and including a plurality of elastic bumps having an uneven shape in the circumferential direction of the hollow. The first foil and the second foil may be formed integrally as one body, and, based on a cross-section perpendicular to the axial direction, the second foil may enclose at least some of the first foil, and the insert part may be connected to an edge of the second foil extending in the circumferential direction of the hollow.

According to an example embodiments of the present disclosure, based on a cross-section perpendicular to the axial direction, the first foil may enclose at least 360 degrees of the circumference of the rotation shaft when the rotation shaft is inserted in the hollow.

According to an example embodiments of the present disclosure, based on a cross-section perpendicular to the axial direction, the second foil may enclose at least 180 to 360 degrees of the circumference of the rotation shaft when the rotation shaft is inserted in the hollow.

According to an example embodiments of the present disclosure, based on a cross-section perpendicular to the axial direction, a second insert part bent in a radial direction of the bearing housing may be at an edge of the first foil, a first through hole and a second through hole may be respectively formed through the first foil and the second foil in a radial direction of the bearing housing, and the second insert part may be inserted, through the first through hole and the second through hole, into the insert slit.

According to an example embodiments of the present disclosure, the airfoil may include a first foil extending along the circumferential direction of the hollow and enclosing at least 180 to 360 degrees of the circumference of the rotation shaft when the rotation shaft is inserted in the hollow, and a pair of second foils respectively connected to opposite edges of the first foil parallel to the axial direction, extending in the circumferential direction of the hollow and enclosing at least 180 to 360 degrees of the circumference of the rotation shaft when the rotation shaft is inserted in the hollow, and including a plurality of elastic bumps having an uneven shape in the circumferential direction of the hollow. The first foil and the pair of second foils may be formed integrally as one body.

According to an example embodiments of the present disclosure, based on a cross-section perpendicular to the axial direction, the airfoil may enclose at least 360 degrees of the circumference of the rotation shaft when the rotation shaft is inserted in the hollow.

According to an example embodiments of the present disclosure, the plurality of elastic bumps may protrudes toward the inner surface of the bearing housing.

According to an example embodiments of the present disclosure, based on a cross-section perpendicular to the axial direction, the insert slit may include a first insert slit and a second insert slit through the bearing housing in different radial directions of the bearing housing, and the insert part may include a first insert part and a second insert part respectively at opposite edges of the airfoil in a circumferential direction of the airfoil. The first insert part may be engaged with a first part of the ring member through the first insert slit, and the second insert part may be engaged with a second part of the ring member through the second insert slit.

According to an example embodiments of the present disclosure, the airfoil may include a top foil in the hollow and that, when the rotation shaft is inserted in the hollow, encloses a range of at least 180 to 360 degrees of the circumference of the rotation shaft; a first bump foil in the hollow, enclosing a first part of the top foil in a circumferential direction of the hollow and including a plurality of elastic bumps having an uneven shape in the circumferential direction of the hollow; and a second bump foil in the hollow, enclosing, in the circumferential direction of the hollow, a second part of the top foil spaced, in the axial direction, apart from the first part of the top foil and including a plurality of elastic bumps having an uneven shape in the circumferential direction of the hollow. The insert part may be at each edge of the top foil, the first bump foil, and the second bump foil.

According to an example embodiments of the present disclosure, to an outer surface of the bearing housing, three ring members may be connected, wherein the ring members may be spaced, in the axial direction, apart from one another, and may be respectively engaged with the insert parts of the top foil, the first bump foil and the second bump foil.

According to an example embodiments of the present disclosure, an airfoil journal bearing may include a bearing housing having an inner surface forming a hollow through the bearing housing so that a rotation shaft is insertable in the hollow and so that, when the rotation shaft is inserted in the hollow, an axial direction of the airfoil journal bearing is the same as a longitudinal direction of the rotation shaft and the hollow longitudinally extends in the axial direction; an airfoil in the hollow and extending in a circumferential direction of the hollow so that, when the rotation shaft is inserted in the hollow, the airfoil encloses at least 180 to 360 degrees of a circumference of the rotation shaft and the airfoil receives pressure generated by rotation of the rotation shaft; and a ring member connected to the bearing housing and enclosing an outer surface of the bearing housing in a circumferential direction of the bearing housing, and configured to fix a position of the airfoil in the axial direction. The bearing housing, based on a cross-section perpendicular to the axial direction, may include an insert slit formed through the bearing housing from the inner surface of the bearing housing forming the hollow to the outer surface of the bearing housing. At least some of the airfoil may pass through the insert slit and is engaged with the ring member.

According to an example embodiments of the present disclosure, the airfoil may include, based on a cross-section perpendicular to the axial direction, an insert part, of which an edge toward the circumferential direction of the hollow is bent toward a radial direction of the bearing housing, extending through the insert slit to the outer surface of the bearing housing. The insert part may include an engagement part into which at least some of an outer surface of the ring member is inserted.

According to an example embodiments of the present disclosure, the insert slit may extend in the axial direction, ring members may be spaced apart from one another and connected to the outer surface of the bearing housing, and the insert part may include engagement parts respectively engaged with the ring members.

According to an example embodiments of the present disclosure, a seating groove may be concavely formed in a circumferential direction of the bearing housing in the outer surface of the bearing housing so that the ring member is seated in the seating groove.

According to an example embodiments of the present disclosure, a mechanical device may include a motor housing; a motor inside the motor housing and including a rotation shaft; an impeller connected to the rotation shaft, an airfoil journal bearing rotatably supporting the rotation shaft, and a bearing seating part connected to the motor housing and including a seating space in which the airfoil journal bearing is seated. The airfoil journal bearing may include a bearing housing having an inner surface forming a hollow through the bearing housing into which the rotation shaft is inserted, an airfoil in the hollow, extending in a circumferential direction of the rotation shaft, and enclosing at least 180 to 360 degrees of a circumference of the rotation shaft, and receiving pressure generated by rotation of the rotation shaft, and a ring member connected to the bearing housing and enclosing an outer surface of the bearing housing in a circumferential direction of the bearing housing. The bearing housing, based on a cross-section perpendicular to an axial direction of the rotation shaft, may include an insert slit formed in a radial direction of the bearing housing through the bearing housing from the inner surface of the bearing housing forming the hollow to the outer surface of the bearing housing. The airfoil may include an insert part bent from an edge of the airfoil in the circumferential direction of the rotation shaft and extending through the insert slit to the outer surface of the bearing housing. An outer surface of the ring member may be engaged with the insert part and configured to fix a position of the airfoil in an axial direction of the airfoil.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
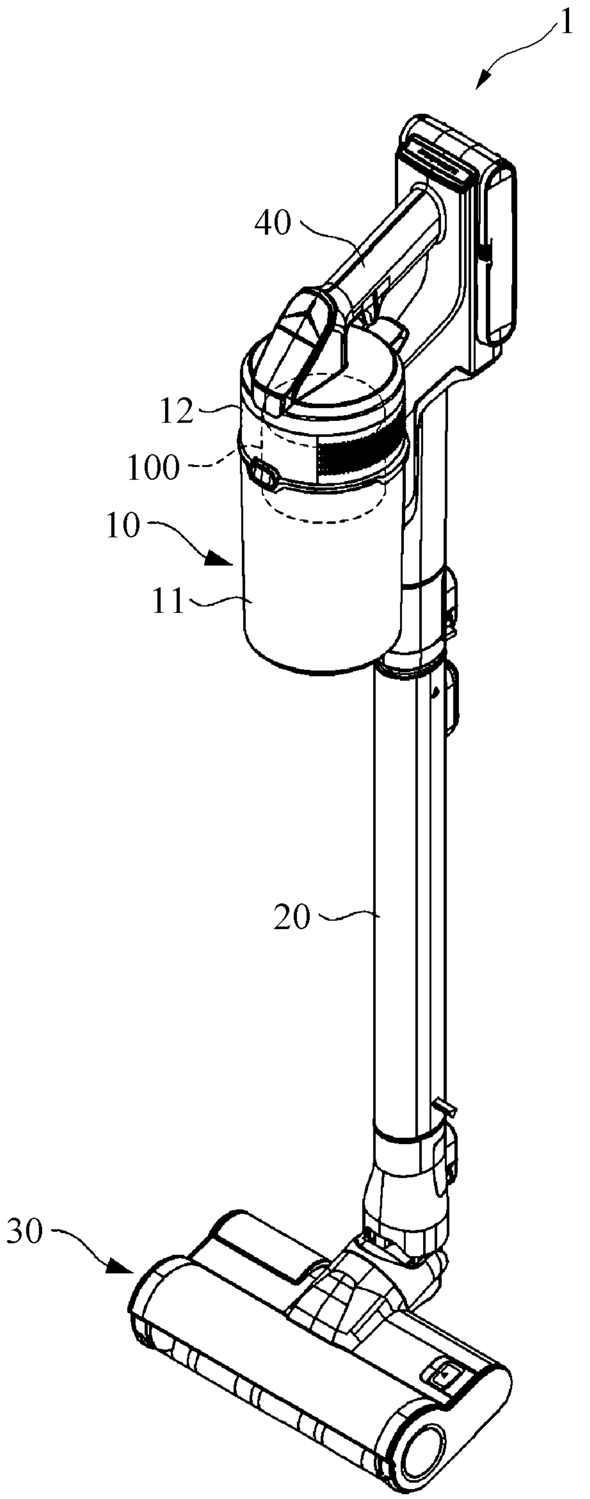
FIG. 1 is a perspective view illustrating a mechanical device according to an example embodiment.

Hereinafter, example embodiments will be described in detail with reference to the accompanying drawings. When describing the example embodiments with reference to the accompanying drawings, like reference numerals refer to like elements and a repeated description related thereto will be omitted.

Various example embodiments of the present disclosure are provided as examples to assist better understanding of technological features described herein. It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as a machine. For example, the machine (e.g., a processor of a mechanical device) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one among the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

A mechanical device, such as a vacuum cleaner and a compressor, may include a motor for rotating a rotor. According to an example embodiment, the mechanical device may include a bearing for supporting rotation of a rotation shaft while constantly maintaining a position of the rotation shaft during operation of the motor. An airfoil journal bearing may include an airfoil for forming a fluid layer on the outer surface of the rotation shaft, and the airfoil may support a load of the rotation shaft not in contact with the rotation shaft through pressure of the fluid layer. Recently, miniaturized mechanical devices have been in demand to satisfy the desires of consumers. The demand for miniaturized mechanical devices may require miniaturization of accessories, such as a motor and a bearing. Accordingly, technology for manufacturing components in a simplified structure has been developed to minimize manufacturing tolerance and resolve an issue of a narrow assembly space.

Example embodiments of the disclosure may provide a mechanical device including an airfoil bearing.

According to example embodiments, a position, in an axial direction, of an airfoil may be fixed by connecting a ring member connected to an outer surface of a bearing housing to the airfoil in a hollow.

According to example embodiments, in an airfoil, a first foil region receiving pressure may be parallel to a second foil region having an elastic effect in an axis direction of a rotation shaft.

According to example embodiments, an airfoil bearing may be miniaturized by minimizing the thickness of an airfoil, and assembly may be less difficult.

According to example embodiments, a position, in an axial direction, of an airfoil may be fixed by connecting a ring member connected to an outer surface of a bearing housing to the airfoil in a hollow. FIG. 1 is a perspective view illustrating a mechanical device according to an example embodiment.

Referring to FIG. 1, a mechanical device may include a motor assembly 100 for generating air pressure through rotational force. Although a vacuum cleaner, to which the motor assembly 100 is applied, is illustrated as an example herein for ease of description, the foregoing example is merely an example and a mechanical device 1, to which the motor assembly 100 is applied, is not limited to the vacuum cleaner.

The mechanical device 1 may be a vacuum cleaner for generating air pressure through an operation of the motor assembly 100. The vacuum cleaner may include a main body 10, a suction head 30, a stick 20, and a handle 40.

The handle 40 may be coupled to the main body 10 and may be gripped by a user such that the user may operate the vacuum cleaner (e.g., the mechanical device 1). The handle 40 may include an operator receiving operation information such that the user may control the vacuum cleaner (e.g., the mechanical device 1).

The suction head 30 may be connected to the main body 10 and may suck dust or contaminants from a surface to be cleaned through sucking force generated from the motor assembly 100 to be described below. The suction head 30 may contact the surface to be cleaned.

The stick 20 may connect the main body 10 to the suction head 30 and include a duct inside the stick 20 such that foreign materials sucked through the suction head 30 may move to the main body 10.

The main body 10 may include a dust collector 11 and a driver 12 inside the main body 10. The dust collector 11 may collect dust by separating foreign materials, such as dust or contaminants, from air sucked in the suction head 30. The driver 12 may generate power for a sucking motion of the vacuum cleaner (e.g., the mechanical device 1). The driver 12 may include the motor assembly 100 inside the driver 12, and the motor assembly 100 may generate rotational force by using electric power.

Figure 2A:
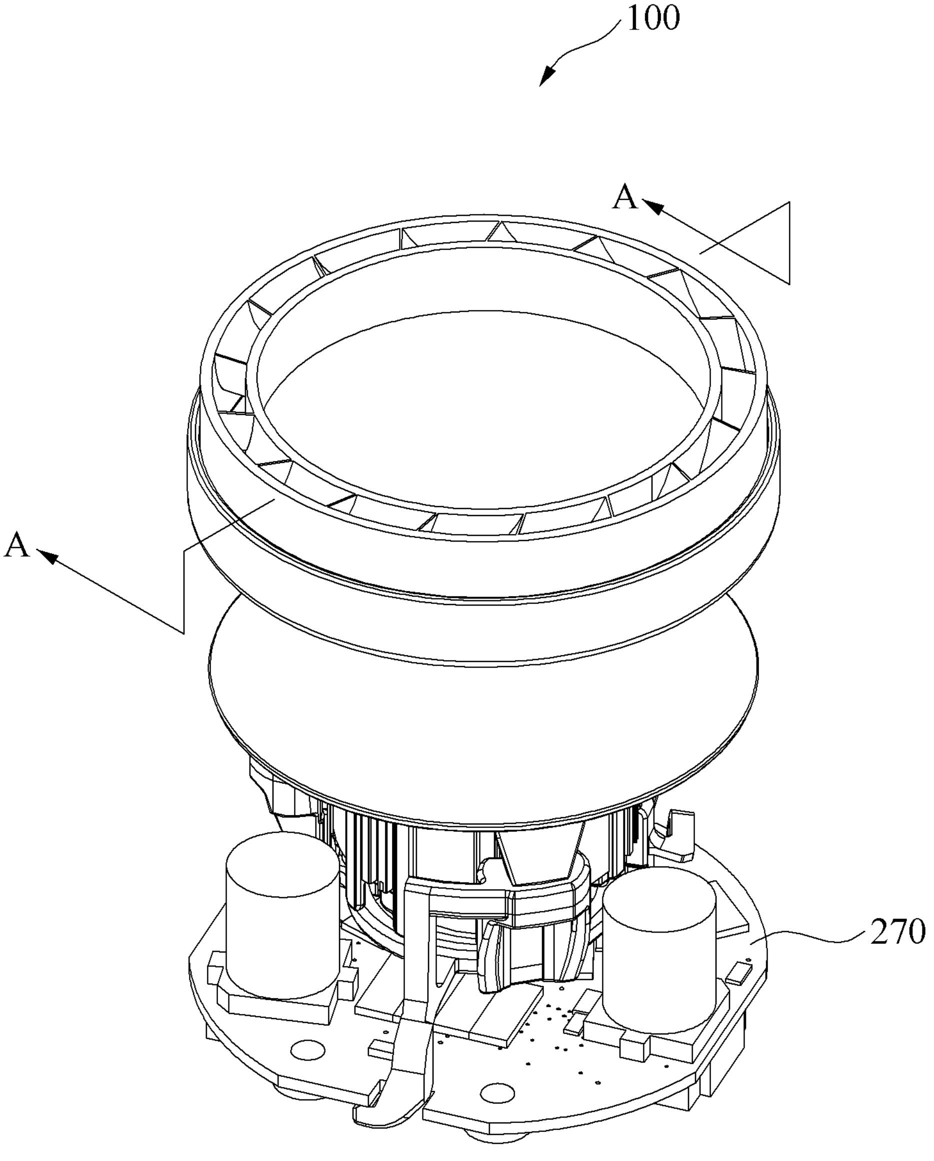
FIG. 2A is a perspective view illustrating a motor assembly according to an example embodiment.
Figure 2B:
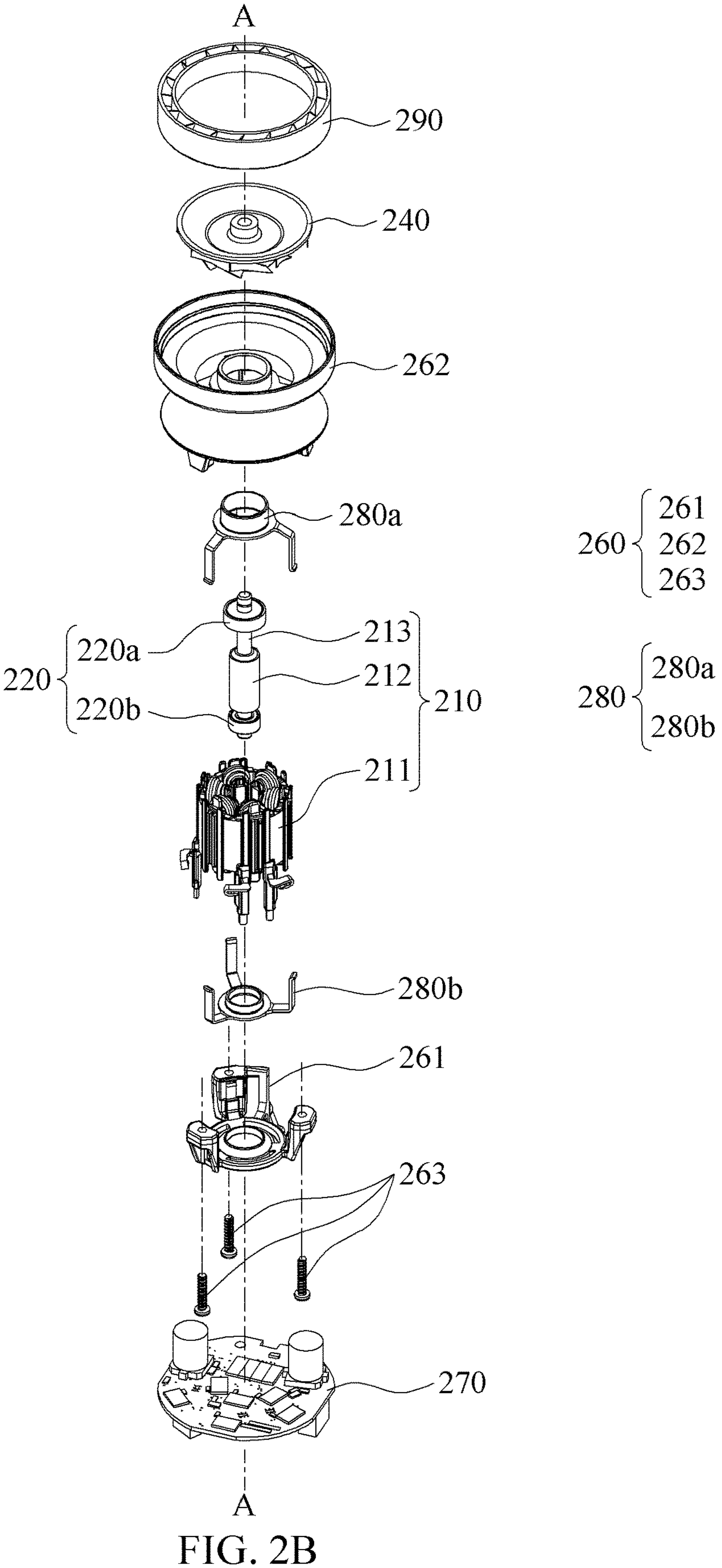
FIG. 2B is an exploded perspective view illustrating the motor assembly according to an example embodiment.
Figure 2C:
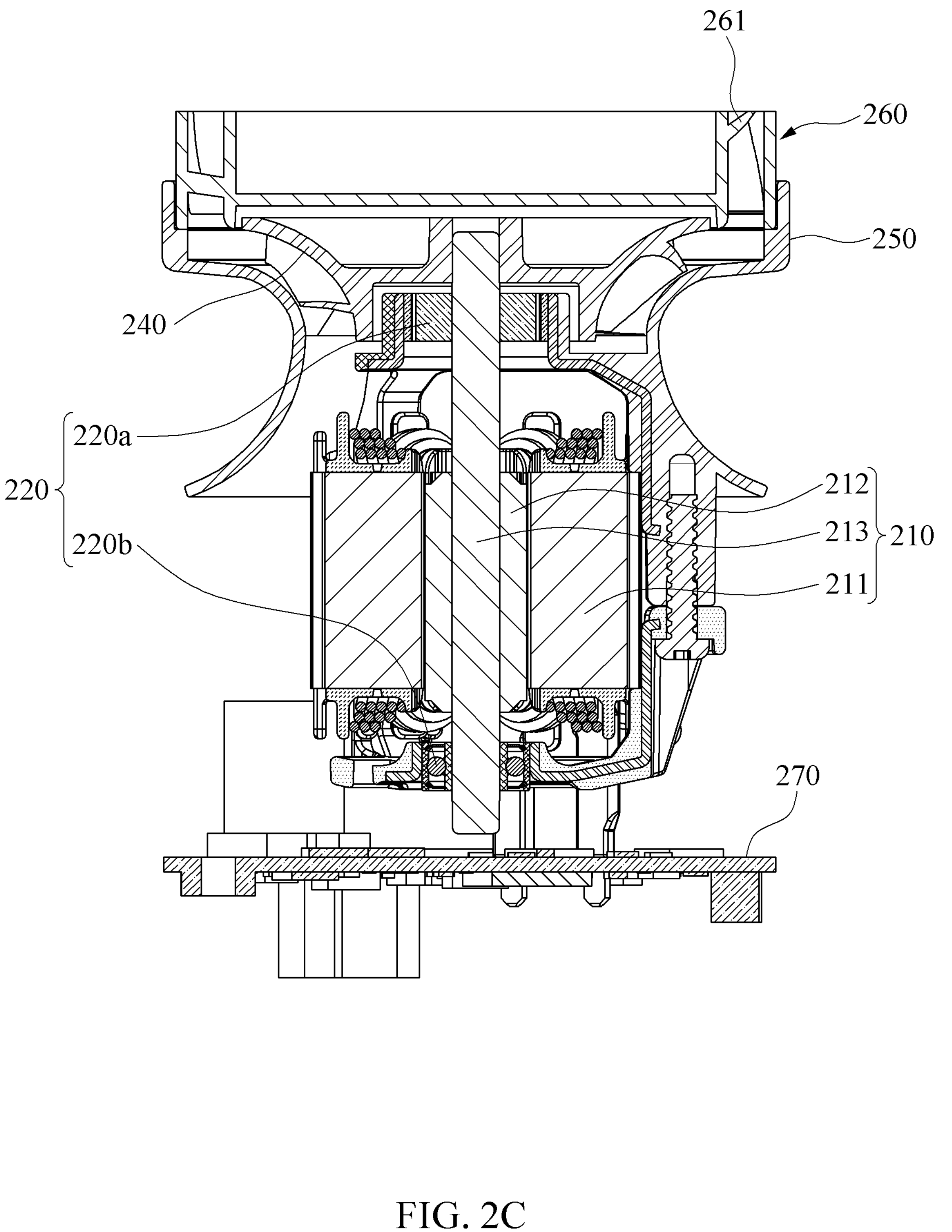
FIG. 2C is a cross-sectional view illustrating the motor assembly according to an example embodiment.

FIG. 2A is a perspective view illustrating a motor assembly according to an example embodiment, FIG. 2B is an exploded perspective view illustrating the motor assembly according to an example embodiment, and FIG. 2C is a cross-sectional view illustrating the motor assembly according to an example embodiment.

Referring to FIGS. 2A to 2C, the motor assembly 100 may generate air pressure through rotational force. The motor assembly 100 may include a motor 210, a motor housing 260, an impeller 240, a diffuser 290, a bearing 220, a bearing seating part 280, and a substrate 270.

The motor 210 may include a stator 211, a rotor 212, and a rotation shaft 213 connected to the rotor 212. The rotor 212 may rotate around an axis through electromagnetic force between the rotor 212 and the stator 211. The stator 211 may annularly surround outside the rotor 212. Although an example of the motor 210 as being a brushless direct-current (BLDC) motor and the stator 211 as being outside the rotor 212 is illustrated herein, examples of the motor assembly 100 may not exclude a structure of the stator 211 being inside the rotor 212. The rotation shaft 213 may be connected to the rotor 212 and may rotate around an axis upon rotation of the rotor 212. The rotation shaft 213 may include a longitudinal direction extending in an axial direction A from the rotor 212.

The motor housing 260 may form the exterior of the motor assembly 100. The motor 210 may be inside the motor housing 260. The motor housing 260 may include a first motor housing 262 and a second motor housing 261 connected to each other in two directions with the motor 210 between the first and second motor housings 262 and 261. In this case, the first motor housing 262 and the second motor housing 261 may be fixed and coupled to each other through a coupling member 263.

The impeller 240 may be connected to the rotation shaft 213. The impeller 240 may be rotated by the motor 210 and may generate air flow. The center of the impeller 240 may be connected to the rotation shaft 213. The impeller 240 may include a body surface formed in a radial direction D from the center of the impeller 240 and a plurality of blades radially formed on the body surface of the impeller 240.

The diffuser 290 may be connected to the motor housing 260 and may guide flow of air flowing through the impeller 240. The diffuser 290 may include a plurality of vanes in a circumferential direction R and may guide a direction of air flowing through the diffuser 290 through the vanes.

The bearing 220 may rotatably support the rotation shaft 213. The rotation shaft 213 may be inserted through inside the bearing 220, and the bearing 220 may enclose the circumference of the rotation shaft 213 and may fix a position of the rotation shaft 213 in the radial direction D perpendicular to the axial direction A. A plurality of first and second bearings **220*a* and 220*b* may be connected to the rotation shaft 213. For example, the bearing 220 may include the first and second bearings 220*a* and 220*b* respectively connected to different parts of the rotation shaft 213 with the rotor 212 between the first and second bearings 220*a* and 220*b*. A pair of bearings 220 may each be fixed to the motor housing 260 through the bearing seating part 280 to be described below and may support rotation of the rotation shaft 213 while fixing a position of the rotation shaft 213 by enclosing and supporting the outer circumferential surface of the rotation shaft 213**.

The bearing 220 may be seated in the bearing seating part 280. The bearing seating part 280 may be connected to the motor housing 260, and a position of the bearing 220 to the motor housing 260 may be fixed by the bearing 220 seated in the bearing seating part 280. When a plurality of bearings (e.g., the first and second bearings **220*a* and 220*b*) is connected to the rotation shaft 213, a plurality of bearing seating parts (e.g., first and second bearing seating parts 280*a* and 280*b*) respectively supporting the plurality of bearings (e.g., the first and second bearings 220*a* and 220*b*) may each be connected to the motor housing 260. For example, the first bearing 220*a* may be connected to the first bearing seating part 280*a* and the second bearing 220*b* may be connected to the second bearing seating part 280***b*. In this case, the first bearing seating part 280*a* may be connected to the first motor housing 262 and the second bearing seating part 280*b* may be connected to the second motor housing 261.

Figure 3A:
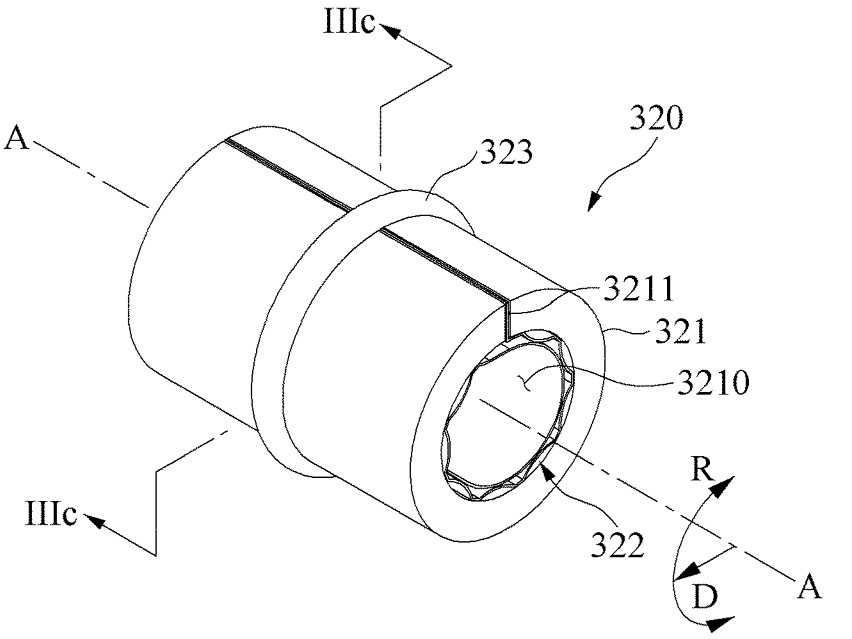
FIG. 3A is a perspective view illustrating an airfoil journal bearing according to an example embodiment.

At least one of the pair of bearings 220 (e.g., the first and second bearings 220*a* and 220*b*) may be an airfoil journal bearing (e.g., an airfoil journal bearing 320 of FIG. 3A). In this case, when one bearing 220, for example, the first bearing 220*a*, is an airfoil journal bearing, the other bearing 220, for example, the second bearing 220*b* may be a ball bearing. However, the foregoing example is provided merely as an example, and there may be other examples that the second bearing 220*b* may be an airfoil bearing or both the first and second bearings 220*a* and 220*b* may be airfoil bearings.

Figure 3B:
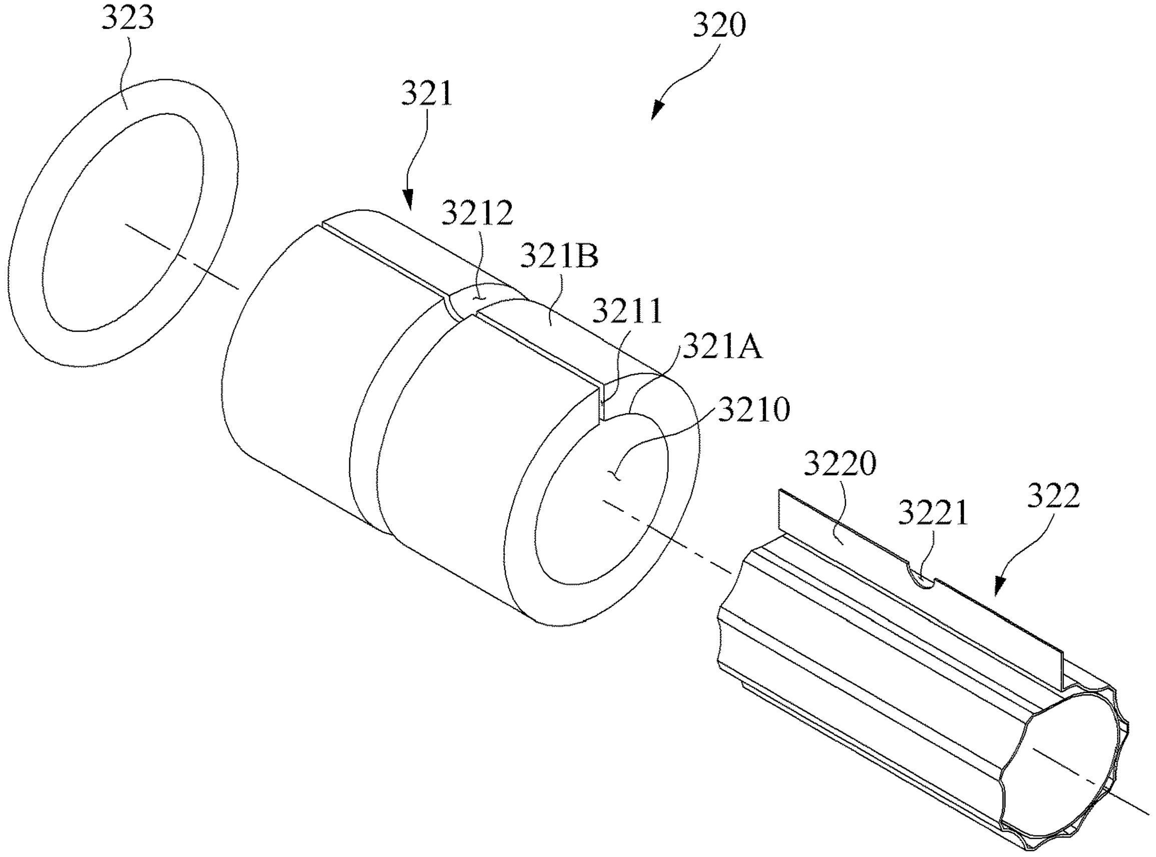
FIG. 3B is an exploded perspective view illustrating the airfoil journal bearing according to an example embodiment.
Figure 3C:
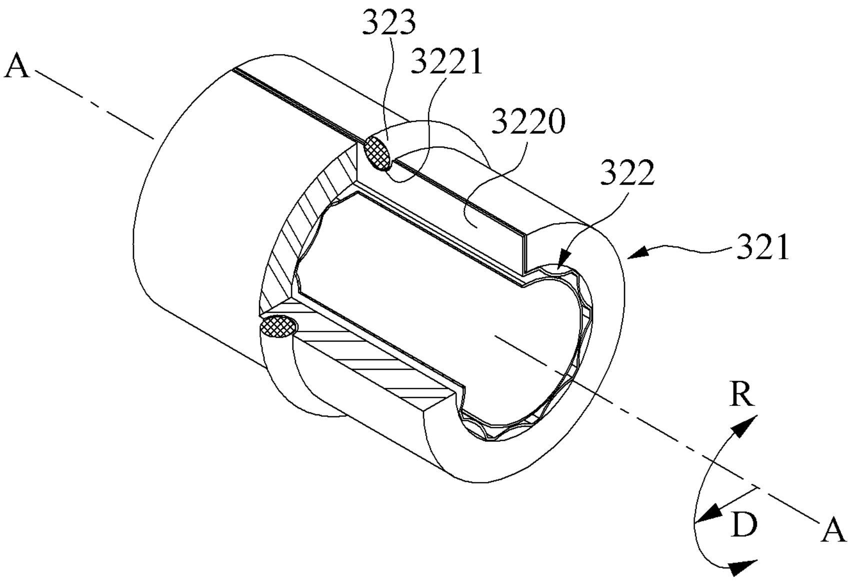
FIG. 3C is a cross-sectional perspective view illustrating an airfoil journal bearing according to an example embodiment.
Figure 3D:
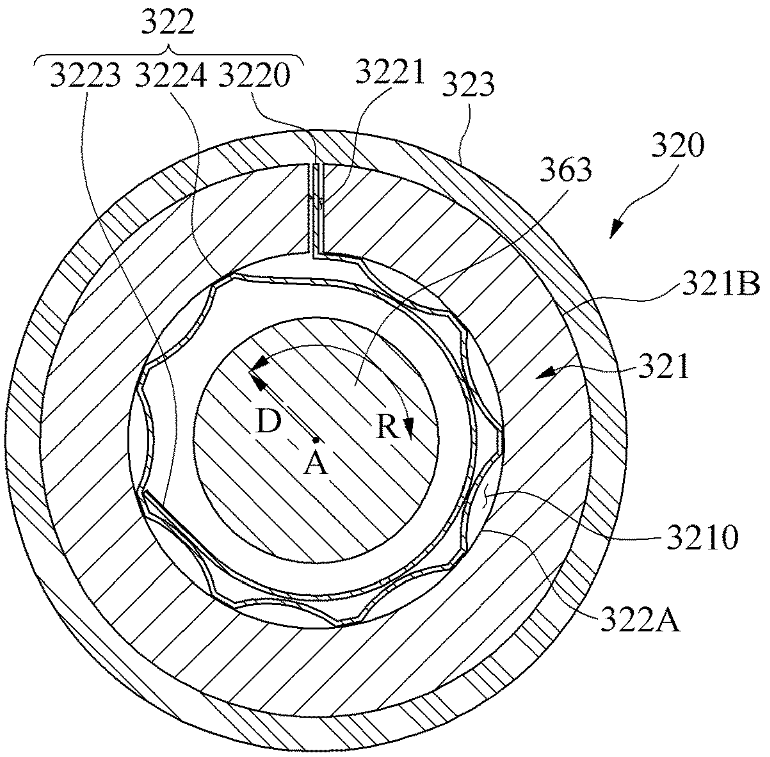
FIG. 3D is a cross-sectional view illustrating the airfoil journal bearing viewed in an axial direction, according to an example embodiment.
Figure 3E:
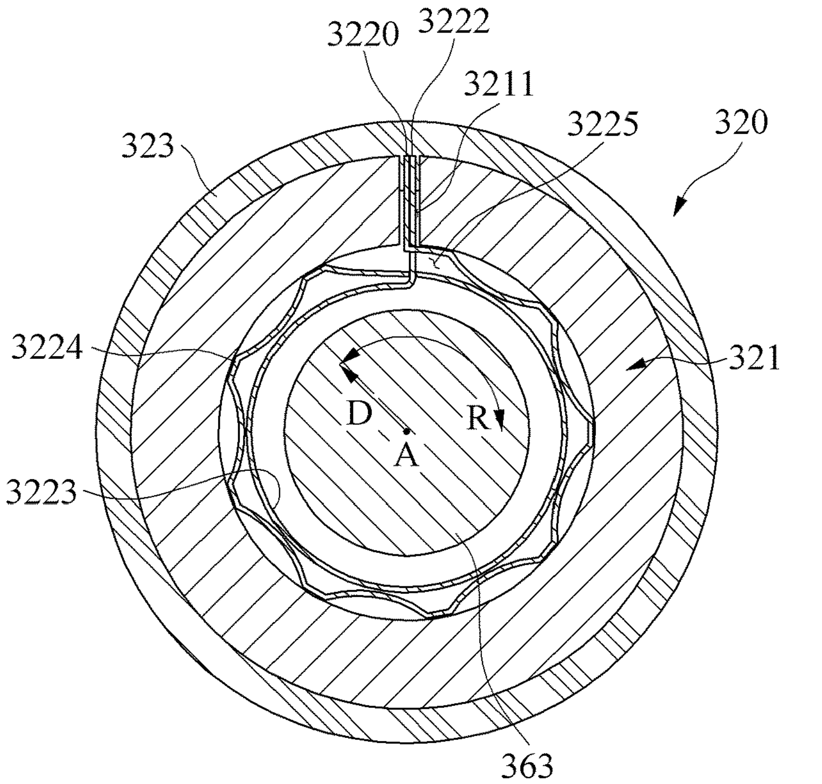
FIG. 3E is a cross-sectional view illustrating the airfoil journal bearing viewed in an axial direction, according to another example embodiment.

FIG. 3A is a perspective view illustrating an airfoil journal bearing according to an example embodiment, FIG. 3B is an exploded perspective view illustrating the airfoil journal bearing according to an example embodiment, FIG. 3C is a cross-sectional perspective view illustrating an airfoil journal bearing according to an example embodiment, FIG. 3D is a cross-sectional view illustrating the airfoil journal bearing viewed in an axial direction, according to an example embodiment, and FIG. 3E is a cross-sectional view illustrating the airfoil journal bearing viewed in an axial direction, according to another example embodiment.

Referring to FIGS. 3A to 3D, an airfoil journal bearing 320 may rotatably support a rotation shaft 363. The airfoil journal bearing 320 may support some of the outer surface of the rotation shaft 363 and may fix the rotation shaft 363 in a predetermined position while supporting a load generated by rotation of the rotation shaft 363. The airfoil journal bearing 320 may form an air layer between itself and the outer circumferential surface of the rotation shaft 363, may decrease frictional force generated between itself and the outer circumferential surface of the rotation shaft 363 through the air layer, and may support a load, in a radial direction D, generated by rotation of the rotation shaft 363. Hereinafter, for ease of description, a longitudinal direction of the rotation shaft 363 may be referred to as an axial direction A, and a circumferential direction of a virtual circle perpendicular to the axial direction A may be referred to as a circumferential direction R. In addition, based on a cross-section of the rotation shaft 363, a straight line direction from the center of the virtual circle perpendicular to the axial direction A to a circumference of the virtual circle may be referred to as a radial direction D. Radial direction D may also be referred to as the radial direction of the bearing housing 321.

The airfoil journal bearing 320 may include a bearing housing 321, a ring member 323, and an airfoil 322.

The bearing housing 321 may include a hollow 3210 into which the rotation shaft 363 is inserted. The hollow 3210 may be formed through the bearing housing 321 in the axial direction A of the rotation shaft 363 such that the rotation shaft 363 may be inserted through the bearing housing 321. The hollow 3210 may have a shape practically corresponding to a cross-sectional shape of the cross-section of the rotation shaft 363, for example, a circular shape. In this case, based on a cross-section perpendicular to the axial direction A, the hollow 3210 may have a circular shape having a diameter that is greater than a diameter of the rotation shaft 363.

The bearing housing 321, based on a cross-section perpendicular to the axial direction A, may include an insert slit 3211 formed through the bearing housing 321 from the hollow 3210 to an outer surface 321B. In this case, the insert slit 3211 may be formed through the bearing housing 321 in the radial direction D. The insert slit 3211 may be formed in the axial direction A. For example, as illustrated in FIG. 3A, the insert slit 3211 may face the outer surface 321B of the bearing housing 321 and may be formed by cutting off the outer surface 321B of the bearing housing 321 in the axial direction A. In this case, the insert slit 3211 may have the same length as the length of the bearing housing 321 in the axial direction A. As another example, the insert slit 3211 may have a length that is less than the length of the bearing housing 321 in the axial direction A. In this case, the insert slit 3211 may be formed by cutting off at least some of the outer surface 321B of the bearing housing 321.

The ring member 323 may be connected to the outer surface 321B of the bearing housing 321. The ring member 323, when the airfoil journal bearing 320 is seated in another component, for example, a bearing seating part (e.g., the bearing seating part 280 of FIG. 2B), may fill a tolerance space for assembly between the bearing housing 320 and the bearing seating part and may maintain a stable structure. The ring member 323 may be formed from an elastic material and may absorb an impact or vibration applied to the bearing housing 321. The ring member 323 may enclose the outer surface 321B of the bearing housing 321 in the circumferential direction R. The ring member 323, based on a cross-section perpendicular to the axial direction A, may be formed in an annular loop. The bearing housing 321 may include a seating groove 3212 recessed in the outer surface 321B in the circumferential direction R. In this case, the ring member 323 may be seated in the seating groove 3212 and may stably maintain a connecting position to the bearing housing 321.

When the ring member 323 encloses the outer surface 321B of the bearing housing 321, the ring member 323 may overlap at least some of the insert slit 3211. For example, when the insert slit 3211 is viewed from the outer surface 321B of the bearing housing 321, the ring member 323 may overlap the insert slit 3211. Accordingly, an edge of the airfoil 322 to be described below may be connected, through the insert slit 3211, to the ring member 323. The ring member 323, by being connected to the airfoil 322 to be described below, may fix a position, in the axial direction A, of the airfoil 322.

The airfoil 322 may be in the hollow 3210. The airfoil 322 may be between the outer surface 321B of the rotation shaft 363 in the hollow 3210 and an inner surface 321A of the hearing housing 321 forming the hollow 3210. Based on a cross-section perpendicular to the axial direction A, the airfoil 322 may enclose the circumference of the outer surface 321B of the rotation shaft 363 in the hollow 3210 and may extend along the circumference direction R of the hollow 3210. For example, as illustrated in FIG. 3D, on a cross-section perpendicular to the axial direction A, the airfoil 322 may enclose the outer surface 321B of the rotation shaft 363 in the circumferential direction R. The airfoil 322 may support the rotation shaft 363 while receiving pressure in the radial direction D during rotation of the rotation shaft 363. For example, an air layer may be between the airfoil 322 and the rotation shaft 363. In this case, during rotation of the rotation shaft 363, when the rotation shaft 363 slightly moves in a certain radial direction (e.g., the radial direction D), the airfoil 322 may receive air pressure from compression of the air layer and may be pushed in the certain radial direction (e.g., the radial direction D). Accordingly, the airfoil 322 may support the rotation shaft 363 to smoothly rotate while minimizing contact with the outer surface 321B of the rotation shaft 363 or maintaining a non-contact state with the outer surface 321B of the rotation shaft 363.

At least some of the airfoil 322 may pass through the insert slit 3211 and may be engaged with the ring member 323. For example, the airfoil 322, based on a cross-section perpendicular to the axial direction A, may include an insert part 3220 bent in the radial direction D from an end in the circumferential direction R. The insert part 3220 may extend to the outer surface 321B of the bearing housing 321 through the insert slit 3211, and the extended edge of the insert part 3220 may be engaged with the outer surface 321B of the ring member 323 overlapping the insert slit 3211. The edge of the insert part 3220 extending to the outer surface 321B of the bearing housing 321 may include an engagement part 3221 concavely formed such that at least some of the outer surface 321B of the ring member 323 may be inserted into the engagement part 3221. For example, when the ring member 323 have a circular cross-sectional shape, based on a cross-section perpendicular to the axial direction A, the engagement part 3221 may have a semicircular concave shape and be at an edge of the insert part 3220. In this case, the airfoil 322, by being engaged with the ring member 323 through the insert part 3220, may prevent itself from deviating in the axial direction A while supporting rotation of the rotation shaft 363.

The airfoil 322, based on a cross-section perpendicular to the axial direction A, as illustrated in FIG. 3D, may include a first foil 3223 and a second foil 3224, in which the first foil 3223 encloses the outer surface 321B of the rotation shaft 363 in the circumferential direction R and the second foil 3224 extends from the first foil 3223 in the circumferential direction R and has a plurality of elastic bumps on its surface.

The first foil 3223 may extend along the inner circumferential surface of the hollow 3210 in the circumferential direction R. The first foil 3223 may directly receive air pressure, in the radial direction D, generated by rotation of the rotation shaft 363. In this case, the first foil 3223 may have a smooth curve surface to effectively receive air pressure. A coating layer may be on the surface, facing the outer surface 321B of the rotation shaft 363, of the first foil 3223 to minimize frictional force generated by contact between the first foil 3223 and the rotation shaft 363. For example, the coating layer may be formed from a polytetrafluorethylene (PETE) material. The rotation shaft 363 may float, spaced apart from the first foil 3223, by pressure of air flowing when the rotation shaft 363 rotates, and accordingly, may smoothly rotate.

The second foil 3224 may extend from the first foil 3223 along the inner surface 321A of the bearing housing 321 forming the hollow 3210 in the circumferential direction R. In this case, the second foil 3224 may be between the first foil 3223 and the inner surface 321A of the bearing housing 321 forming the hollow 3210. A plurality of elastic bumps having an uneven shape may be on a surface of the second foil 3224 in the circumferential direction R. The plurality of elastic bumps, based on a cross-section perpendicular to the axial direction A, may have an uneven shape concave or convex in the radial direction D and may be spaced apart from one another in the circumferential direction R. The second foil 3224 may receive, through the first foil 3223, external force generated by rotation of the rotation shaft 363, in the radial direction D, and may maintain a non-contact state between the outer surface 321B of the rotation shaft 363 and the first foil 3223 through an elastic effect of the elastic bumps.

The insert part 3220 may be at the edge, extending from the first foil 3223 in the circumferential direction R, of the second foil 3224. The insert part 3220 may be bent in the radial direction D from the edge, in the circumferential direction R, of the second foil 3224 and may extend to the outer surface 321B of the bearing housing 321 through the insert slit 3211.

The first foil 3223 and the second foil 3224 may be formed integrally as one body. For example, the first foil 3223 and the second foil 3224 may be formed integrally as one body by rolling one plate in the circumferential direction R. For example, a plate region corresponding to the second foil 3224 may be pressed to form elastic bumps having an uneven shape, the second foil 3224 may be rolled to enclose the outside of the first foil 3223, and accordingly, the airfoil 322 may have an integral form. The first foil 3223 and the second foil 3224 may not separately be formed and assembled, and the airfoil 322 is formed integrally as one body. Therefore, assembling the bearing housing 321 may be simplified.

The first foil 3223 and the second foil 3224 may each have a predetermined width, and their widths parallel to the axial direction A may be the same. In this case, the airfoil 322 may maintain a predetermined width in the circumferential direction R.

The second foil 3224, based on a cross-section perpendicular to the axial direction A, may have a forming angle, enclosing the rotation shaft 363, from 180 to 360 degrees. For example, as illustrated in FIG. 3D, when a position in which an insert part 3220 of the second foil 3224 is 0 degrees based on the circumferential direction R, the first foil 3223 may enclose the outer surface 321B of the rotation shaft 363 in a half to a full circle in a counterclockwise direction from the insert part 3220. In this case, a forming angle of the second foil 3224 may be determined based on a load applied by the rotation shaft 363, friction, vibration, or design conditions, such that the second foil 3224 may enclose the rotation shaft 363 at various angles.

The first foil 3223, based on a cross-section perpendicular to the axial direction A, may have a forming angle, enclosing the rotation shaft 363, greater than or equal to 360 degrees. In this case, the first foil 3223 may enclose the exterior of rotation shaft 363, and the rotation shaft 363 may be and rotate in the hollow 3210, preventing a bump foil and the inner surface 321A of the bearing housing 321 forming the hollow 3210 of the bearing housing 321 from directly facing the outer surface 321B of the rotation shaft 363. In this case, one surface, toward the rotation shaft 363, of the second foil 3224 may face and overlap the outer surface 321B, toward the inner surface 321A of the bearing housing 321 forming the hollow 3210, of the first foil 3223, and accordingly, may enclose at least some of the first foil 3223.

The airfoil 322 may be fixed to the bearing housing 321 through the second foil 3224. For example, the insert part 3220 may be connected to an edge extending in the circumferential direction R of the second foil 3224, and the second foil 3224 may be fixed to the bearing housing 321 through the insert part 3220. An edge, in the circumferential direction R, of the first foil 3223 may be formed as a free edge as illustrated in FIG. 3D.

Both edges of the airfoil 322 may be fixed to the bearing housing 321. For example, as illustrated in FIG. 3E, the second foil 3224 may be inserted and fixed into the insert slit 3211 through the insert part 3220 at the edge, extending in the circumferential direction R, of the second foil 3224, and the first foil 3223 may be inserted and fixed into the insert slit 3211 through a second insert part 3222 at the edge, extending in the circumferential direction R of the first foil 3223, and accordingly, both edges of the airfoil 322 may be fixed to the bearing housing 321. The second insert part 3220 may be bent in the radial direction D from the edge, in the circumferential direction R, of the first foil 3223 and inserted into the insert slit 3211. In this case, the second insert part 3220 may pass through the bearing housing 321 through the insert slit 3211 to be engaged with the ring member 323. The airfoil 322, based on a cross-section perpendicular to the axial direction A, may include a through hole in a region overlapping the insert slit 3211. For example, a first through hole and a second through hole may be respectively formed through surfaces of the first foil 3223 and the second foil 3224. In this case, the second insert part 3220 may pass through the first and second through holes and be inserted into the insert slit 3211.

Figure 4A:
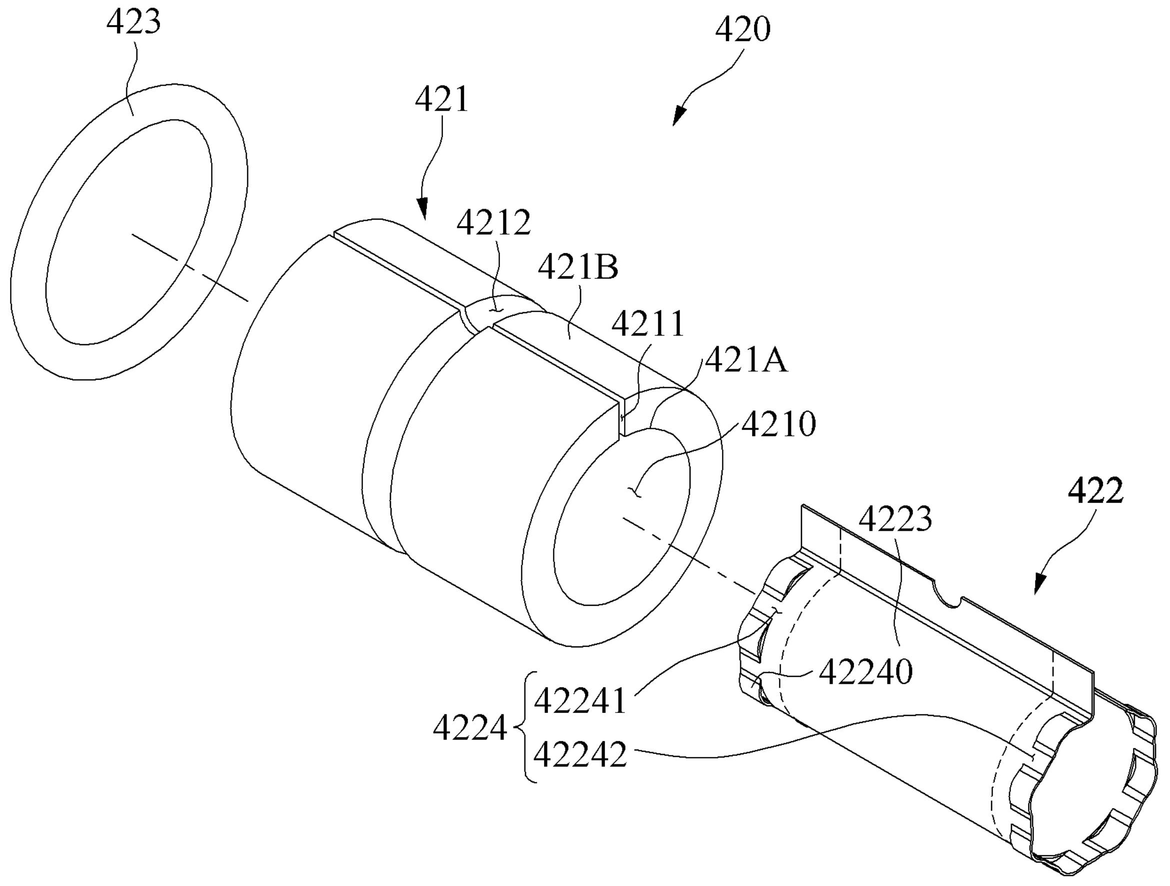
FIG. 4A is an exploded perspective view illustrating an airfoil journal bearing according to another example embodiment.
Figure 4B:
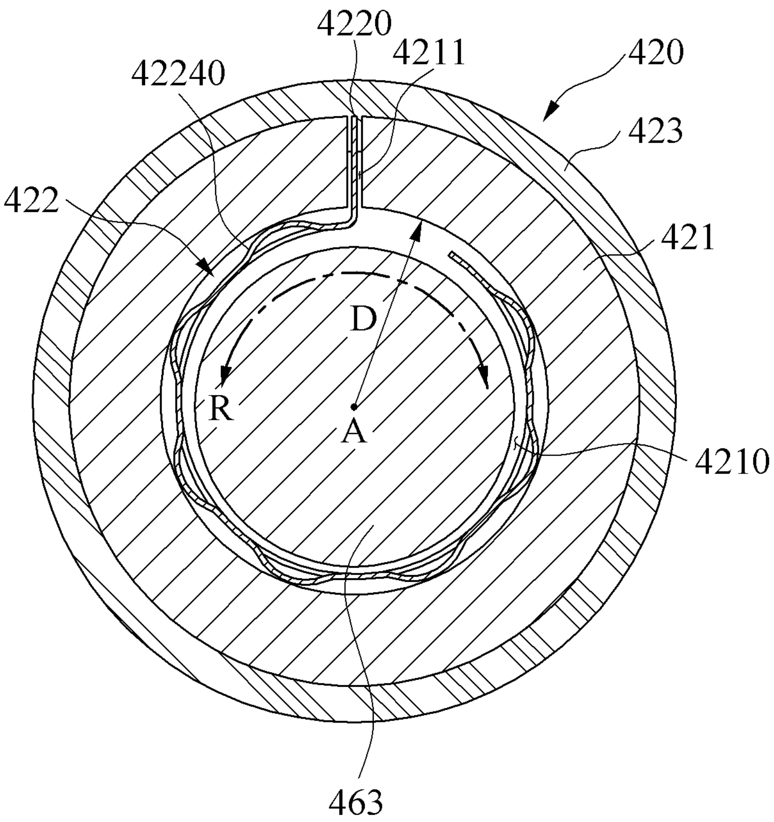
FIG. 4B is a diagram illustrating a ring member arrangement region of the airfoil journal bearing viewed in an axial direction, according to an example embodiment.
Figure 4C:
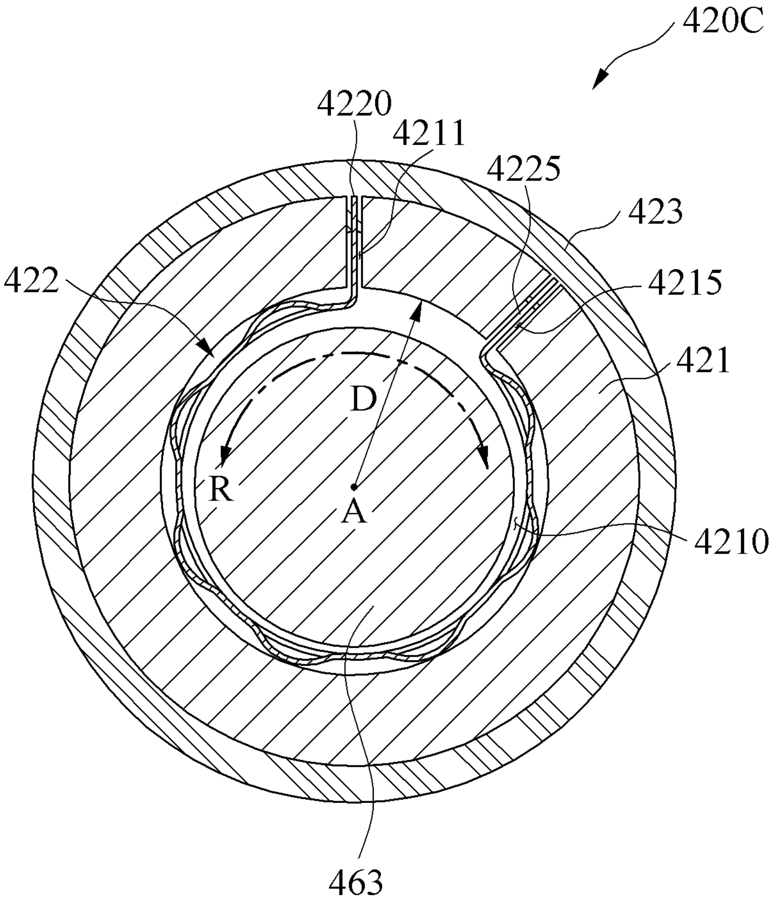
FIG. 4C is a diagram illustrating a ring member arrangement region of the airfoil journal bearing viewed in an axial direction, according to another example embodiment.

FIG. 4A is an exploded perspective view illustrating an airfoil journal bearing according to another example embodiment, FIG. 4B is a diagram illustrating a ring member arrangement region of the airfoil journal bearing viewed in an axial direction, according to an example embodiment, and FIG. 4C is a diagram illustrating a ring member arrangement region of an airfoil journal bearing viewed in an axial direction, according to another example embodiment.

Referring to FIGS. 4A and 4B, an airfoil journal bearing 420 may rotatably support a rotation shaft 463. The airfoil journal bearing 420 may include a bearing housing 421, a ring member 423, and an airfoil 422.

The bearing housing 421 may include a hollow 4210 into which the rotation shaft 463 is inserted. The hollow 4210, in the axial direction A, in which the rotation shaft 463 is inserted, may be formed through the interior of the bearing housing 421. Based on a cross-section perpendicular to the axial direction A, an outer surface 421B of the bearing housing 421 and an inner surface 421A of the bearing housing 421 forming the hollow 4210 may each have a circular cross-sectional shape. The bearing housing 421, based on a cross-section perpendicular to the axial direction A, may include an insert slit 4211 formed through the bearing housing 421, in the radial direction D, from the hollow 4210 to the outer surface 421B of the bearing housing 421. The insert slit 4211 may be formed by cutting off, in the axial direction A, the outer surface 421B of the bearing housing 421.

The ring member 423 may be connected to the outer surface 421B of the bearing housing 421. The ring member 423 may be connected to enclose the outer surface 421B of the bearing housing 421 in the circumferential direction R. In this case, a seating groove 4212 is recessed, in the circumferential direction R, in the outer surface 421B of the bearing housing 421, and the ring member 423 may be seated in the seating groove 4212 and stably connected to the outer surface 421B of the bearing housing 421. The ring member 423 may be formed from an elastic material, for example, rubber.

The airfoil 422 may be in the hollow 4210 and enclose the outer surface 421B of the rotation shaft 463. The airfoil 422, based on a cross-section perpendicular to the axial direction A, may extend in the circumferential direction R along a circumference of the rotation shaft 463 as illustrated in FIG. 4B. The airfoil 422 may include an insert part 4220 of which the edge in the circumferential direction R is bent in the radial direction D. The insert part 4220, through the insert slit 4211, may extend from the hollow 4210 to the outer surface 421B of the bearing housing 421. In this case, the insert part 4220 may be engaged with the ring member 423 connected to the outer surface 421B of the bearing housing 421. For example, the edge of the insert part 4220, extending to the outer surface 421B of the bearing housing 421, may include an engagement part concavely formed such that at least some of the outer surface 421B of the ring member 423 may be inserted into the engagement part. The airfoil 422 may be engaged with the ring member 423 through the insert part 4220, and accordingly, a position of the airfoil 422, in the axial direction A, may be fixed. The airfoil 422, while supporting the rotation shaft 463 to rotate, may prevent itself from deviating, in the axial direction A, outside the hollow 4210.

The airfoil 422 may include a first foil 4223 and a pair of second foils 42241 and 42242 (collectively referred to as 4224) respectively at both edges of the first foil 4223. For example, based on the axial direction A, the first foil 4223 may be between the pair of second foils 4224. The first foil 4223 and the pair of second foils 4224 may extend, in the circumferential direction R, and enclose the circumference of the rotation shaft 463 and may enclose different outer surfaces 421B of the rotation shaft 463 in the hollow 4210 in the axial direction A. In this case, the first foil 4223 and the pair of second foils 4224 may have practically the same length in the circumferential direction R.

The first foil 4223 may receive pressure generated by rotation of the rotation shaft 463. The first foil 4223 may receive pressure of an air layer upon rotation of the rotation shaft 463 through the air layer between the first foil 4223 and the outer surface 421B of the rotation shaft 463. The first foil 4223 may have a smooth curve surface. In this case, a coating layer including a PETE material may be on the inner surface 421A of the first foil 4223 facing the outer surface 421B of the rotation shaft 463. The coating layer, when the first foil 4223 and the rotation shaft 463 are in contact with each other during rotation of the rotation shaft 463, may decrease friction from contact, maintain a floating state of the first foil 4223 from the outer surface 421B of the rotation shaft 463, and support the rotation shaft 463 to smoothly rotate.

The second foils 4224 may respectively be, in the axial direction A of the rotation shaft 463, connected to both edges of the first foil 4223. In this case, a plurality of elastic bumps 42240 having an uneven shape may be, in the circumferential direction R, in each of the second foils 42241 and 42242. The plurality of elastic bumps 42240 may protrude from the outer surface 421B of the rotation shaft 463 toward the inner surface 421A of the bearing housing 421 forming the hollow 4210. In this case, the elastic bumps 42240 may be formed by pressing at least some of the second foils 4224 such that the at least some of the second foils 4224 have a relatively great curvature than another region. The plurality of elastic bumps 42240 may be formed by other known methods, for example, embossing. The elastic bumps 42240 may be spaced apart from one another at regular distance, in the circumferential direction, in the second foils 4224. However, the foregoing example is merely an example, and the distance between the elastic bumps 42240 may vary depending on design conditions of the airfoil 422. For example, the airfoil 422, to match a damping function performed by the plurality of elastic bumps 42240 with design conditions, may include a relatively long distance between the plurality of elastic bumps 42240. In addition, although, in the examples illustrated in the drawings (e.g., FIG. 4A), each foil region includes one elastic bump 42240 in the axial direction A of the airfoil 422, each of the second foils 4224 may include a plurality of elastic bumps 42240 in the axial direction A of the airfoil 422.

The airfoil 422 may receive external force, in the radial direction D, generated by rotation of the rotation shaft 463 through the first foil 4223, maintain a non-contact state with the outer surface 421B of the rotation shaft 463 through an elastic effect in the radial direction D through the second foils 4224, and support the rotation shaft 463 to rotate.

The first foil 4223 and the pair of second foils 4224 may be formed integrally as one body. For example, the airfoil 422 may have the elastic bumps 42240 formed in the second foils 4224, and then, may be formed integrally as one body by rolling a processed plate-shaped single member in the circumferential direction R. Accordingly, the first foil 4223 and the second foils 4224 may be formed in a single member, in which the first foil 4223 receives external force in the radial direction D from the rotation shaft 463 and the second foils 4224 perform an elastic function in response to the external force in the radial direction D. Therefore, the first foil 4223 and the second foils 4224 may not need a separate assembly process for connection, and assembly and maintenance on the bearing housing 421 may be simplified. The first foil 4223 and the second foils 4224 may not be stacked and may be formed parallel to the axial direction A. Therefore, the thickness, in the radial direction D, of the airfoil 422 in the hollow 4210 may be minimized. The diameter of the hollow 4210, into which the airfoil 422 is inserted, may decrease, and accordingly, the bearing housing 421 may be miniaturized.

The airfoil 422, based on a cross-section perpendicular to the axial direction A, may have a forming angle, enclosing the rotation shaft 463, from 180 to 360 degrees. For example, the airfoil 422, as illustrated in FIG. 4B, may enclose the outer surface 421B of the rotation shaft 463 in a half to a full circle in a counterclockwise direction from an edge of the airfoil 422 including the insert part 4220.

Referring to FIG. 4C, an airfoil journal bearing 420C may include the bearing housing 421, the ring member 423, and the airfoil 422.

The bearing housing 421 may form an exterior of the airfoil journal bearing 420. The bearing housing 421 may include the hollow 4210 formed through the bearing housing 421 in the axial direction A such that the rotation shaft 463 may be inserted. The bearing housing 421, based on a cross-section perpendicular to the axial direction A, may include a plurality of first and second insert slits 4211 and 4215 formed through the bearing housing 421, in the radial direction D, from the hollow 4210 to the outer surface 421B of the bearing housing 421. For example, the plurality of first and second insert slits 4211 and 4215, based on a cross-section perpendicular to the axial direction A, may include the first insert slit 4211 and the second insert slit 4215 formed through the bearing housing 421 in different radial directions D.

The ring member 423 may be connected as one unit and enclose the outer surface of the bearing housing 421 in the circumferential direction R. In this case, the ring member 423, viewed from outside the bearing housing 421, may overlap each of the first insert slit 4211 and the second insert slit 4215. For example, a first part of the ring member 423 may overlap the first insert slit 4211 and a second part of the ring member 423 may overlap the second insert slit 4215.

The airfoil 422 may be in the hollow 4210 such that the airfoil 422 may enclose the outer surface of the rotation shaft 463 in the circumferential direction R. Both edges, in the circumferential direction R, of the airfoil 422 may be fixed to the bearing housing 421. For example, the airfoil 422 may include the first insert part 4220 and the second insert part 4225 bent in the radial direction D respectively at both edges, in the circumferential direction R, of the airfoil 422. The first insert part 4220 may be inserted into the first insert slit 4211, and the second insert part 4225 may be inserted into the second insert slit 4215. In this case, the first insert part 4220 may extend through the first insert slit 4211 outside the bearing housing 421 and an edge of the first insert part 4220 may be engaged with the first part of the ring member 423. In addition, the second insert part 4225 may extend through the second insert slit 4215 outside the bearing housing 421 and an edge of the second insert part 4225 may be engaged with the second part of the ring member 423. In this case, both edges, in the circumferential direction R, of the airfoil 422 may be engaged with the first and second parts of the ring member 423, and accordingly, the airfoil 422 may be fixed to the bearing housing 421. Therefore, during rotation of the rotation shaft 463, a position, in the axial direction A, of the airfoil 422 may be fixed.

Figure 5A:
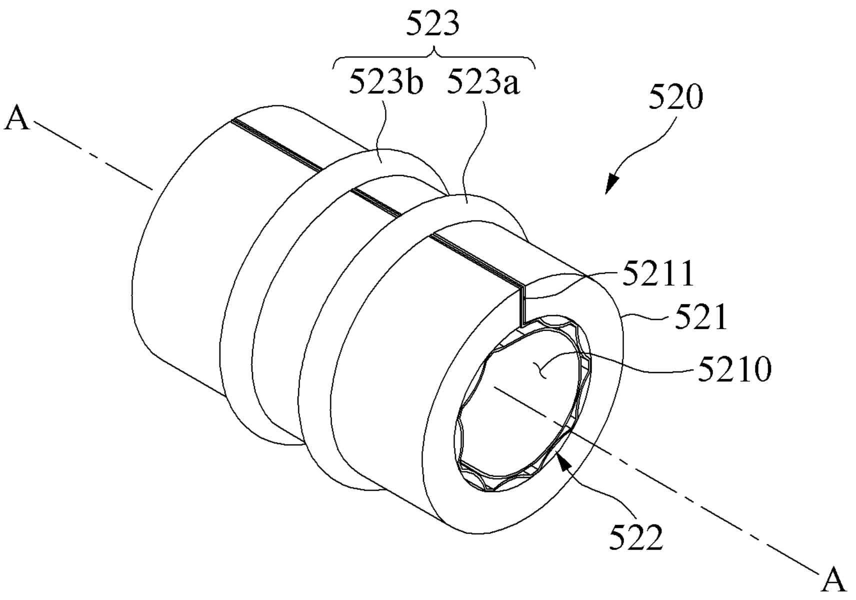
FIG. 5A is a perspective view illustrating an airfoil journal bearing according to another example embodiment.
Figure 5B:
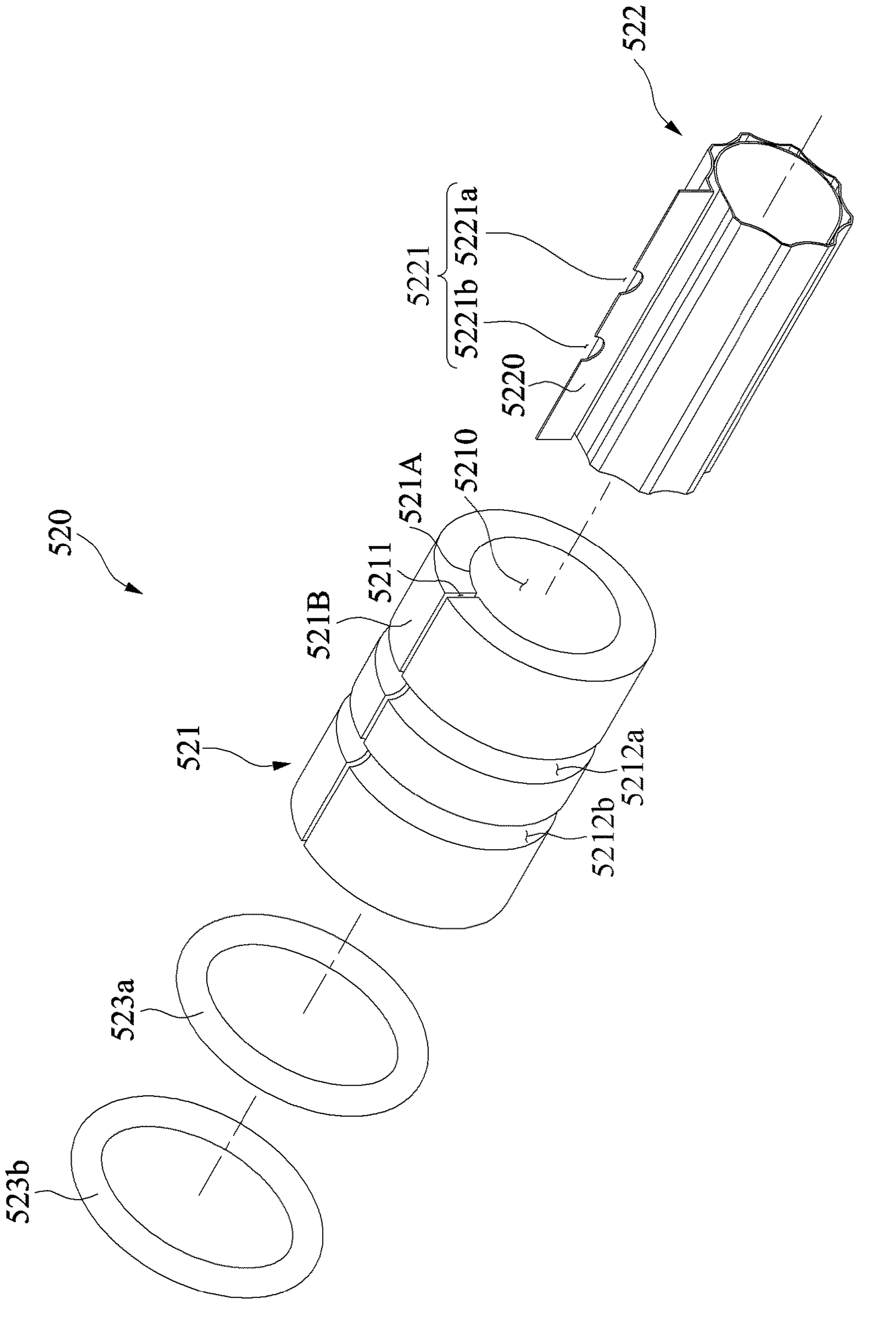
FIG. 5B is an exploded perspective view illustrating the airfoil journal bearing according to another example embodiment.

FIG. 5A is a perspective view illustrating an airfoil journal bearing according to another example embodiment, and FIG. 5B is an exploded perspective view illustrating an airfoil journal bearing according to another example embodiment.

Referring to FIGS. 5A and 5B, an airfoil journal bearing 520 may include a bearing housing 521, a plurality of ring members 523, and an airfoil 522.

The bearing housing 521 may include a hollow 5210 formed through the bearing housing 521 in the axial direction A. The bearing housing 521 may include an insert slit 5211 penetrating the bearing housing 521 in the radial direction D from an inner surface 521A of the bearing housing 521 forming the hollow 5210 to an outer surface 521B of the bearing housing 521. The insert slit 5211 may be formed in the axial direction A from the outer surface 521B of the bearing housing 521.

The plurality of ring members 523 may each be connected to the outer surface 521B of the bearing housing 521. The plurality of ring members 523 may enclose the bearing housing 521 in the circumferential direction R and may be spaced apart from one another in the axial direction A. For example, the plurality of ring members 523 may include a first ring member 523*a* and a second ring member 523*b*. In this case, the outer surface 521B of the bearing housing 521 may include a plurality of seating grooves (e.g., first and second seating grooves 5212*a* and 5212*b*) recessed in the circumferential direction R and respectively seating the plurality of ring members 523. For example, the outer surface 521B of the bearing housing 521 may include the first seating groove 5212*a* for seating the first ring member 523*a* and the second seating groove 5212*b* for seating the second ring member 523*b*. The first and second ring members 523*a* and 523*b* may overlap the insert slit 5211, facing the outer surface 521B of the bearing housing 521.

The airfoil 522 may be in the hollow 5210. The airfoil 522 may enclose, in the circumferential direction R, the outer surface of a rotation shaft in the hollow 5210. At least some of the airfoil 522 may be engaged with the ring member 523 through the insert slit 5211. For example, the airfoil 522 may include an insert part 5220 of which the edge is bent in the radial direction D and inserted into the insert slit 5211 from the hollow 5210. In this case, the insert part 5220 may extend outside the bearing housing 521 through the insert slit 5211. The extended edge of the insert part 5220 may include one or more engagement parts 5221 for engaging with the ring members 523. For example, as illustrated in FIG. 5B, a first engagement part 5221*a* for engaging with the first ring member 523*a* and a second engagement part 5221*b* for engaging with the second ring member 523*b* may each be at an edge of the insert part 5220. In this structure, the airfoil 522 may be engaged with the plurality of ring members 523, and accordingly, a position, in the axial direction A, of the airfoil 522 may be stably fixed.

Figure 6A:
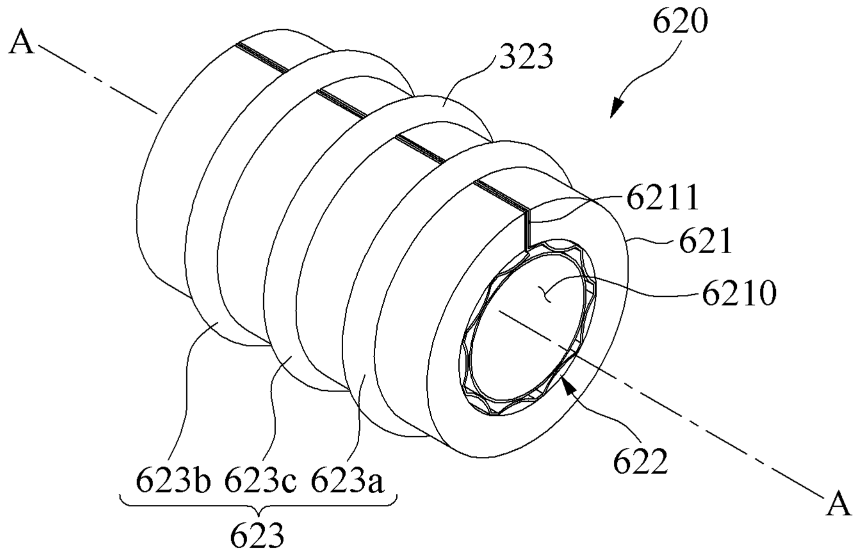
FIG. 6A is a perspective view illustrating an airfoil journal bearing according to another example embodiment.
Figure 6B:
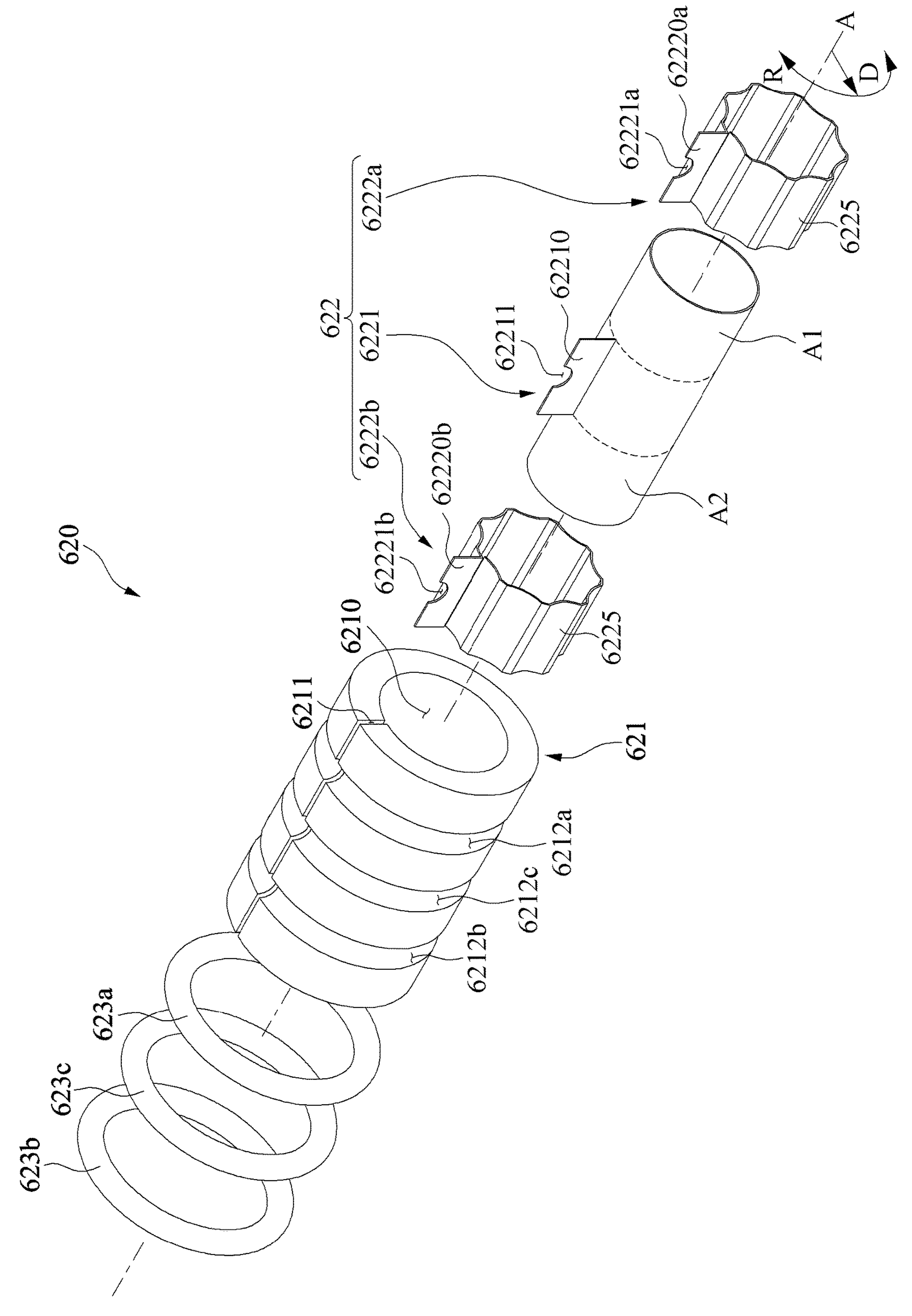
FIG. 6B is an exploded perspective view illustrating the airfoil journal bearing according to another example embodiment.

FIG. 6A is a perspective view illustrating an airfoil journal bearing according to another example embodiment, and FIG. 6B is an exploded perspective view illustrating the airfoil journal bearing according to another example embodiment.

Referring to FIGS. 6A and 6B, an airfoil journal bearing 620 may include a bearing housing 621, a plurality of ring members 623, and an airfoil 622.

The bearing housing 621 may include a hollow 6210 into which a rotation shaft is inserted. The hollow 6210 may be formed through, in the axial direction A, the bearing housing 621. The bearing housing 621, based on a cross-section perpendicular to the axial direction A, may include an insert slit 6211 formed through the bearing housing 621, in the radial direction D, from the hollow 6210 to the outer surface of the bearing housing 621. The insert slit 6211, facing the outer surface of the bearing housing 621, may be formed by cutting off the bearing housing 621 parallel to the rotation shaft.

The plurality of ring members 623 may be connected to the outer surface of the bearing housing 621. In this case, each of the plurality of ring members 623 may enclose the bearing housing 621 in the circumferential direction R. The plurality of ring members 623 may be spaced apart from one another in the axial direction A and connected to the outer surface of the bearing housing 621. For example, the plurality of ring members 623 may include a first ring member 623*a*, a second ring member 623*b*, and a third ring member 623*c*. The outer surface of the bearing housing 621 may include a plurality of seating grooves (e.g., first, second, and third seating grooves 6212*a*, 6212*b*, and 6212*c*) recessed in the circumferential direction R and respectively seating the plurality of ring members 623. For example, the outer surface of the bearing housing 621 may include the first seating groove 6212*a*, the second seating groove 6212*b*, and the third seating groove 6212*c*, spaced apart from one another in the axial direction A. In this case, the first, second, and third seating grooves 6212*a*, 6212*b*, and 6212*c* may respectively seat the first, second, and third ring members 623*a*, 623*b*, and 623*c*.

The airfoil 622 may be in the hollow 6210 and support the rotation shaft to rotate. The airfoil 622 may include a top foil 6221, a first bump foil 6222*a*, and a second bump foil 6222*b*.

The top foil 6221 may be in the hollow 6210 and may enclose the outer surface of the rotation shaft (e.g., the rotation shaft 363 of FIG. 3D) in the circumferential direction R. The top foil 6221 may have a cylindrical shape. The top foil 6221 may receive a load, in the radial direction D, generated by rotation of the rotation shaft. For example, an air layer may be between the top foil 6221 and the rotation shaft, and the top foil 6221 may receive pressure, in the radial direction D, from pressure of the air layer upon rotation of the rotation shaft. The top foil 6221 may have a curved inner surface facing the outer surface of the rotation shaft. In this case, the inner surface of the top foil 6221 may include a coating layer for decreasing frictional force generated from contact with the rotation shaft. The coating layer may be formed from, for example, a PETE material. The length, in the axial direction A, of the top foil 6221 may practically be the same as the length, in the axial direction A, of the bearing housing 621.

The first bump foil 6222*a* and the second bump foil 6222*b* may respectively be connected to first and second parts A1 and A2 of the top foil 6221. The first bump foil 6222*a* may be in the hollow 6210 and enclose the first part A1 in the circumferential direction R, and the second bump foil 6222*b* may be in the hollow 6210 and enclose the second part A2 in the circumferential direction R. In other words, the first bump foil 6222*a* may be between the first part A1 of the top foil 6221 and the inner surface of the bearing housing 621 forming the hollow 6210, and the second bump foil 6222*b* may be between the second part A2 of the top foil 6221 and the inner surface of the bearing housing 621 forming the hollow 6210. In this case, the first and second parts A1 and A2 of the top foil 6221 may be spaced apart from each other in the axial direction A at a predetermined distance. The first and second bump foils 6222*a* and 6222*b* each may have a cylindrical shape and include a plurality of elastic bumps 6225 having an uneven surface. The plurality of elastic bumps 6225 on each surface of the first and second bump foils 6222*a* and 6222*b* may be in the circumferential direction R of the first and second bump foils 6222*a* and 6222*b*. The first and second bump foils 6222*a* and 6222*b* may generate elastic force in response to external force applied, in the radial direction D, to the top foil 6221 during rotation of the rotation shaft.

Each of the top foil 6221, the first bump foil 6222*a*, and the second bump foil 6222*b* may be fixed, through the ring members 623, to the bearing housing 621. The top foil 6221, the first bump foil 6222*a*, the second bump foil 6222*b*, which are inserted into the hollow 6210, may respectively include insert parts 62210, 62220*a*, and 62220*b* inserted into the insert slit 6211. In this case, the insert part 62210 of the top foil 6211 may extend outside the bearing housing 621 through the insert slit 6211 and may be engaged with the third ring member 623*c*. Similarly, the insert part 62220*a* of the first bump foil 6222*a* and the insert part 62220*b* of the second bump foil 6222*b* may extend outside the bearing housing 621 through the insert slit 6211 and may be respectively engaged with the first and second ring members 623*a* and 623*b*. An edge of the insert part 62210 of the top foil 6221 may include a first engagement part 62211 for engaging with the third ring member 623*c*, an edge of the insert part 62220*a* of the first bump foil 6222*a* may include a second engagement part 62221*a* for engaging with the first ring member 623*a*, and an edge of the insert part 62220*b* of the second bump foil 6222*b* may include a third engagement part 62221*b* for engaging with the second ring member 623*b*. In this structure, the top foil 6221, the first bump foil 6222*a*, and the second bump foil 6222*b* may respectively be connected to the plurality of ring members 623, and their position in the axial direction A may be fixed.

Figure 7A:
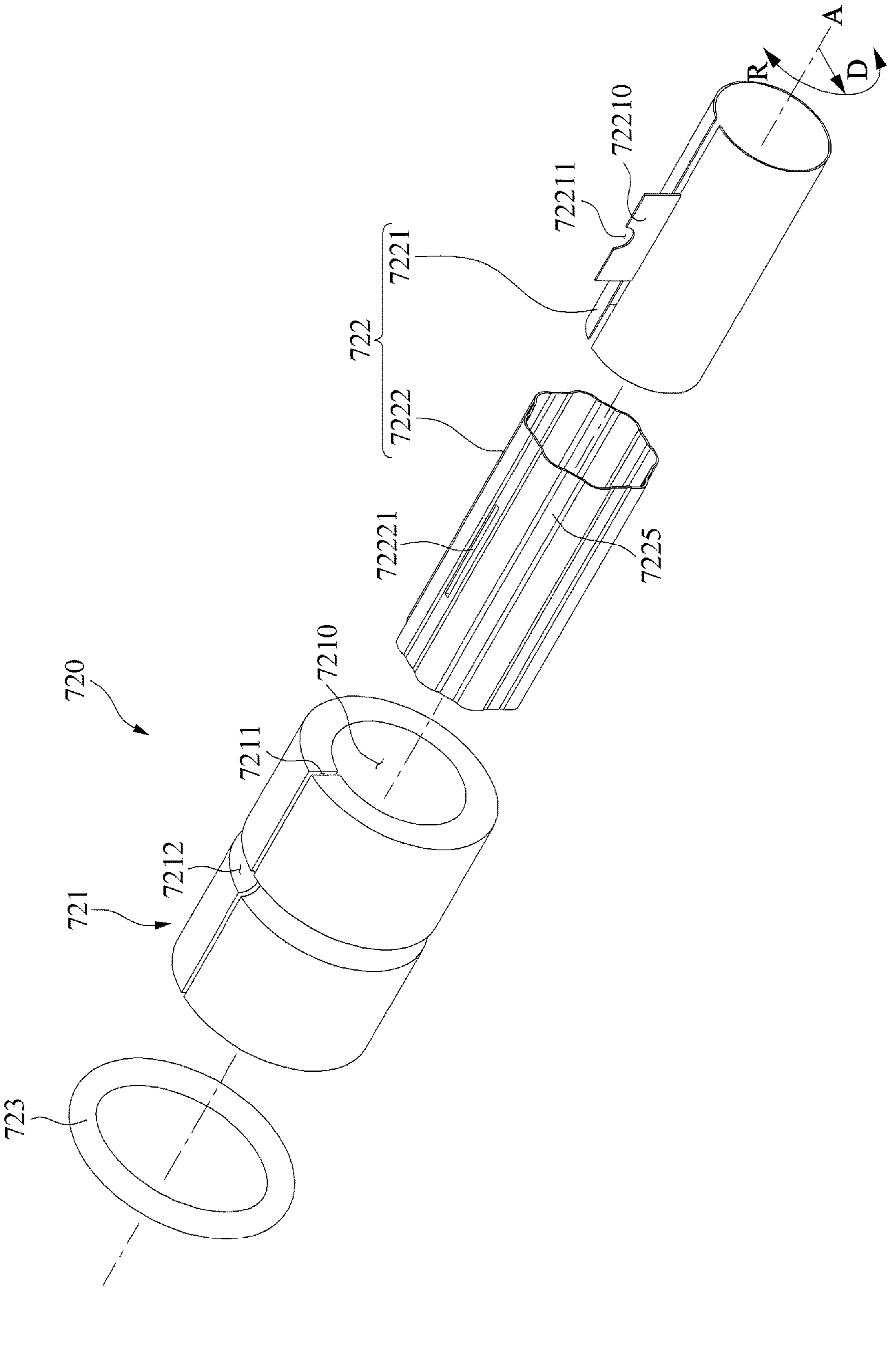
FIG. 7A is an exploded perspective view illustrating an airfoil journal bearing according to another example embodiment.
Figure 7B:
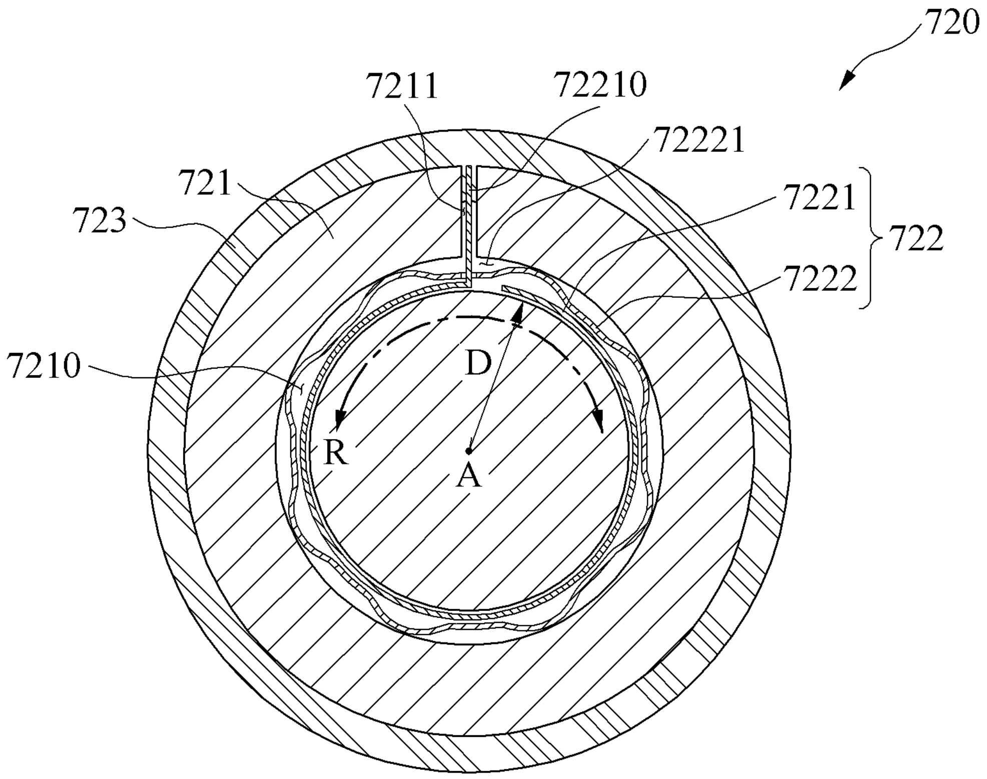
FIG. 7B is a diagram illustrating a ring member arrangement region of the airfoil journal bearing viewed in an axial direction, according to another example embodiment.

FIG. 7A is an exploded perspective view illustrating an airfoil journal bearing according to another example embodiment, and FIG. 7B is a diagram illustrating a ring member arrangement region of the airfoil journal bearing viewed in an axial direction, according to another example embodiment.

Referring to FIGS. 7A and 7B, an airfoil journal bearing 720 may include a bearing housing 721, a ring member 723, and an airfoil 722.

The bearing housing 721 may include a hollow 7210 into which a rotation shaft is inserted. The hollow 7210 may be formed through, in the axial direction A, the bearing housing 721. The bearing housing 721, based on a cross-section perpendicular to the axial direction A, may include an insert slit 7211 formed through the bearing housing 721, in the radial direction D, from the hollow 7210 to the outer surface of the bearing housing 721. The insert slit 7211, facing the outer surface of the bearing housing 721, may be formed by cutting off the bearing housing 721 parallel to the rotation shaft.

The ring member 723 may be connected to the outer surface of the bearing housing 721. In this case, the ring member 723 may enclose the bearing housing 721 in the circumferential direction R. The ring member 723 may be seated in a seating groove 7212, which is recessed in the outer surface of the bearing housing 721 in the circumferential direction R.

The airfoil 722 may be in the hollow 7210 and support the rotation shaft to rotate. The airfoil 722 may include a top foil 7221 and a bump foil 7222.

The top foil 7221 may be in the hollow 7210 and may enclose the outer surface of the rotation shaft in the circumferential direction R. The top foil 7211 may receive a load, in the radial direction D, generated by rotation of the rotation shaft. An air layer may be between the top foil 7211 and the rotation shaft, and the top foil 7211 may receive pressure, in the radial direction D, in response to a pressure change of the air layer upon rotation of the rotation shaft. The top foil 7211 may include a coating layer on the inner surface of the top foil 7211 facing the rotation shaft. The coating layer may decrease frictional force generated from contact between the top foil 7211 and the rotation shaft. For example, the coating layer may include a PETE material. The length, in the axial direction A, of the top foil 7211 may practically be the same as the length, in the axial direction A, of the bearing housing 721. The top foil 7221 may include an insert part 72210, in which at least some of an edge of the top foil 7221 extending in the circumferential direction R is bent in the radial direction D. The insert part 72210, while the top foil 7211 is in the hollow 7210, may extend outside the bearing housing 721 through the insert slit 7211. In this case, the insert part 72210 may be engaged with the ring member 723. For example, the insert part 72210 may include an engagement part 72211 for engaging with the ring member 723.

The bump foil 7222 may be in the hollow 7210 such that the bump foil 7222 may enclose the outer surface of the top foil 7221 in the circumferential direction R. The bump foil 7222 may be between the top foil 7221 and the inner surface of the bearing housing 721 forming the hollow 7210. The bump foil 7222 may have a cylindrical shape and include a plurality of elastic bumps 7225 having an uneven surface. The plurality of elastic bumps 7225 may be in the circumferential direction R of the bump foil 7222. The bump foil 7222 may generate elastic force in response to external force applied, in the radial direction D, to the top foil 7221 during rotation of the rotation shaft. The bump foil 7222 may include an opening 72221 through which the insert part 72210 of the top foil 7221 passes. In this case, while the bump foil 7222 is in the hollow 7210, the opening 72221 may be in a region overlapping the insert slit 7211.

Although the example illustrated in the drawings may be the insert part 72210 inserted into the opening 72221 of the bump foil 7222 and the bump foil 7222 and the top foil 7221 connected to each other, the foregoing example is merely an example. The bump foil 7222, similar to the top foil 7221, may include an insert part connected to the ring member 723 through the insert slit 7211 at an edge.

According to example embodiments, an airfoil journal bearing 320 is configured to rotatably support a rotation shaft 363 and includes a bearing housing 321 including a hollow 3210 formed through the bearing housing 321 in an axial direction A such that the rotation shaft 363 is inserted into the hollow 3210; an airfoil 322, in the hollow 3210, enclosing the circumference of the rotation shaft 363 and extending in a circumferential direction of the hollow 3210; and a ring member 323 that is annular and connected to the bearing housing 321 and enclosing an outer surface 321B of the bearing housing 321 in a circumferential direction. The bearing housing 321 includes, based on a cross-section perpendicular to the axial direction, an insert slit 3211 formed through the bearing housing 321 in a radial direction D from the hollow 3210 to the outer surface 321B of the bearing housing 321, and the airfoil 322 includes, based on a cross-section perpendicular to the axial direction, an insert part 3220 bent from a circumferential direction R to the radial direction D and extending, through the insert slit 3211, to the outer surface 321B of the bearing housing 321, in which the airfoil 322 is engaged with an outer surface 321B of the ring member 323 through the insert part 3220.

The airfoil 322 may include an engagement part 3221 formed at an edge of the insert part 3220 extending to the outer surface 321B of the bearing housing 321 and being concave such that at least some of the outer surface 321B of the ring member 323 is inserted into the engagement part 3221.

A plurality of ring members 523 may be connected to the outer surface of the bearing housing 521, and a plurality of engagement parts 5221 may be at the edge of the insert part 5220, in which the engagement parts 5221 are respectively connected to first and second ring members 523*a* and 523*b*.

The insert slit 5211 may be in the axial direction A, and the first and second ring members 523*a* and 523*b* may be spaced apart from one another in the axial direction A.

The bearing housing 321 may include a seating groove 3212 formed in the outer surface 321B of the bearing housing 321 in a circumferential direction R of the bearing housing 321 and where the ring member 323 sits.

The airfoil 322 includes a first foil 3223 extending along the inner circumferential surface of the hollow 3210 in the circumferential direction of the hollow 3210, and a second foil 3224 extending along the inner circumferential surface of the hollow 3210 from the first foil 3223 in the circumferential direction R of the hollow 3210 and including a plurality of elastic bumps having an uneven shape in the circumferential direction R of the hollow 3210, in which the first foil 3223 and the second foil 3224 are formed integrally as one body, and based on a cross-section perpendicular to the axial direction, the second foil 3224 may enclose at least some of the first foil 3223, and the insert part 3220 may be connected to an edge of the second foil 3224 extending in the circumferential direction R of the hollow 3210.

Based on a cross-section perpendicular to the axial direction A, a forming angle, of the first foil 3223, enclosing the rotation shaft 363 may be greater than or equal to 360 degrees.

Based on a cross-section perpendicular to the axial direction A, a forming angle, of the second foil 3224, enclosing the rotation shaft 363 may be from 180 to 360 degrees.

Based on a cross-section perpendicular to the axial direction A, a second insert part 3222 bent in the radial direction D is at an edge of the first foil 3223, a first through hole and a second through hole may be respectively formed through the first foil 3223 and the second foil 3224 in the radial direction D, and the second insert part 3222 is inserted, through the first through hole and the second through hole, into the insert slit 3211.

The airfoil 422 may include a first foil 4223 and a pair of second foils 4224, in which the first foil 4223 extends in the circumferential direction R and encloses the circumference of the rotation shaft 463, and the second foils 4224 are respectively connected to both edges of the first foil 4223 parallel to the axial direction A, extend in a circumferential direction and enclose the circumference of the rotation shaft, and include a plurality of elastic bumps 42240 having an uneven shape in the circumferential direction R. The first foil 4223 and the pair of second foils 4224 may be formed integrally as one body.

Based on a cross-section perpendicular to the axial direction A, a forming angle, of the airfoil 422, enclosing the rotation shaft 463 may be from 180 to 360 degrees.

The plurality of elastic bumps 42240 may protrude toward the inner circumferential surface of the hollow.

Based on a cross-section perpendicular to the axial direction A, the insert slit may include a first insert slit 4211 and a second insert slit 4215 through the bearing housing 421 in different radial directions D, and the insert part may include a first insert part 4220 and a second insert part 4225 respectively at both edges of the airfoil 422 in a circumferential direction R of the airfoil 422. The first insert part 4220 may be engaged with a first part of the ring member 423 through the first insert slit 4211, and the second insert part 4225 may be engaged with a second part of the ring member 423 through the second insert slit 4215.

The airfoil 622 may include a top foil 6221, a first bump foil 6222*a*, and a second bump foil 6222*b*, in which the top foil 6221 is in the hollow 6210 and encloses the rotation shaft in a circumferential direction R, the first bump foil 6222*a* is in the hollow 6210, encloses a first part of the top foil 6221 in a circumferential direction R, and includes a plurality of elastic bumps having an uneven shape in the circumferential direction R, and the second bump foil 6222*b* is in the hollow 6210, encloses, in the circumferential direction R, a second part of the top foil 6221 spaced, in the axial direction A, apart from the first part of the top foil 6221, and includes a plurality of elastic bumps having an uneven shape in the circumferential direction R. The insert parts 62210, 62220*a*, and 62220*b* may be respectively at edges of the top foil 6221, the first bump foil 6222*a*, and the second bump foil 6222*b*.

Three of the ring members 623 may be connected to the outer surface of the bearing housing 621, in which the ring members 623 are spaced, in the axial direction A, apart from one another, are respectively engaged with the insert portions of the top foil 6222, the first bump foil 6222*a* and the second bump foil 6222*b*.

According to example embodiments, an airfoil journal bearing 320 is configured to rotatably support a rotation shaft 363. The airfoil journal bearing 320 includes a bearing housing 321, an airfoil 322, and a ring member 323, in which the bearing housing 321 includes a hollow 3210 formed through the bearing housing 321 in an axial direction A such that the rotation shaft 363 is inserted into the hollow 3210, the airfoil 322 is in the hollow 3210, extends, in a circumferential direction R, and encloses the outer surface of the rotation shaft 363, and receives pressure generated by rotation of the rotation shaft 363, and the ring member 323 is connected to the bearing housing 321, encloses the outer surface of the bearing housing 321 in a circumferential direction R, and fixes a position of the airfoil 322 in an axial direction A. The bearing housing 321, based on a cross-section perpendicular to the axial direction A, includes an insert slit 3211 formed through the bearing housing 321 from the hollow 3210 to the outer surface of the bearing housing 321, and at least some of the airfoil 322 passes through the insert slit 3211 and is engaged with the ring member 323.

The airfoil 322 may include an insert part 3220. Based on a cross-section perpendicular to the axial direction A, the insert part 3220, of which the edge toward a circumferential direction R is bent toward a radial direction D, may extend through the insert slit 3211 to the outer surface of the bearing housing 321. The insert part 3220 may include an engagement part 3221 into which at least some of the outer surface of the ring member 323 is inserted.

The insert slit 5211 may be in an axial direction A of the bearing housing 521, a plurality of ring members 523 may be spaced apart from one another and connected to the outer surface of the bearing housing 521, and the insert part 5220 may include first and second engagement parts 5221*a* and 5221*b* respectively engaged with the first and second ring members 523*a* and 523*b*.

A seating groove 3212 may be concavely formed in a circumferential direction R in the outer surface of the bearing housing 321 such that the ring member 323 is seated in the seating groove 3212.

According to example embodiments, a mechanical device includes a motor housing 260, a motor 210 inside the motor housing 260 and including a rotation shaft 213 for performing a rotating function, an impeller 240 connected to the rotation shaft 213, an airfoil journal bearing 320 for rotatably supporting the rotation shaft 213, and a bearing seating part 280 connected to the motor housing 260 and including a seating space for seating the airfoil journal bearing 320. The airfoil journal bearing 320 includes a bearing housing 321 including a hollow 3210 into which the rotation shaft 363 is inserted, an airfoil 322 in the hollow 3210, extending, in a circumferential direction R, and enclosing the outer surface of the rotation shaft 363 and receiving pressure generated by rotation of the rotation shaft 363, and a ring member 323 connected to the bearing housing 321 and enclosing an outer surface 321B of the bearing housing 321 in the circumferential direction R. The bearing housing 321, based on a cross-section perpendicular to an axial direction A of the rotation shaft 363, includes an insert slit 3211 formed in a radial direction D through the bearing housing 321 from the hollow 3210 to the outer surface 321B of the bearing housing 321. The airfoil 322 includes an insert part 3220 bent from an edge of the airfoil 322 in the circumferential direction R and extending through the insert slit 3211 to the outer surface 321B of the bearing housing 321. The outer surface of the ring member 323 is engaged with the insert part 3220 and fixes a position of the airfoil 322 in an axial direction A of the airfoil 322.

The technical goals to be achieved through example embodiments of the present disclosure are not limited to those described above, and other technical goals not mentioned above may be clearly understood by one of ordinary skill in the art from the disclosure herein.

Although example embodiments have been described herein in detail, it should be understood that the various changes, substitutions, and alterations could be made hereto without departing from the spirit and scope of the embodiments.

What is claimed is:

1. An airfoil journal bearing comprising:

a bearing housing having an inner surface forming a hollow through the bearing housing so that a rotation shaft is insertable in the hollow and so that, when the rotation shaft is inserted in the hollow, an axial direction of the airfoil journal bearing is the same as a longitudinal direction of the rotation shaft and the hollow longitudinally extends in the axial direction;

an airfoil in the hollow and extending in a circumferential direction of the hollow so that, when the rotation shaft is inserted in the hollow, the airfoil encloses at least 180 to 360 degrees of a circumference of the rotation shaft; and a ring member that is annular and is connected to the bearing housing, and enclosing an outer surface of the bearing housing in a circumferential direction of the bearing housing, wherein the bearing housing comprises:

based on a cross-section perpendicular to the axial direction, an insert slit formed through the bearing housing in a radial direction of the bearing housing from the inner surface of the bearing housing forming the hollow to the outer surface of the bearing housing, and the airfoil comprises:

based on a cross-section perpendicular to the axial direction, an insert part bent from a circumferential direction of the airfoil to the radial direction of the bearing housing and extending, through the insert slit, to the outer surface of the bearing housing, wherein the airfoil is engaged with an outer surface of the ring member through the insert part.

2. The airfoil journal bearing of claim 1, wherein the airfoil comprises:

an engagement part formed at an edge of the insert part extending to the outer surface of the bearing housing and being concave so that at least some of the outer surface of the ring member is inserted into the engagement part.

3. The airfoil journal bearing of claim 2, wherein a plurality of ring members is connected to the outer surface of the bearing housing, and a plurality of the engagement parts is at the edge of the insert part, wherein the plurality of engagement parts is respectively connected to the plurality of ring members.

4. The airfoil journal bearing of claim 3, wherein the insert slit is in the axial direction, and the ring members are spaced apart from one another in the axial direction.

5. The airfoil journal bearing of claim 1, wherein the bearing housing comprises:

a seating groove formed in the outer surface of the bearing housing in the circumferential direction of the bearing housing and where the ring member sits.

6. The airfoil journal bearing of claim 1, wherein the airfoil comprises:

a first foil extending along the inner surface of the bearing housing forming the hollow in the circumferential direction of the hollow, and a second foil extending along the inner surface of the bearing housing forming the hollow from the first foil in the circumferential direction of the hollow and including a plurality of elastic bumps having an uneven shape in the circumferential direction of the hollow, wherein the first foil and the second foil are formed integrally as one body, and based on a cross-section perpendicular to the axial direction, the second foil encloses at least some of the first foil, and the insert part is connected to an edge of the second foil extending in the circumferential direction of the hollow.

7. The airfoil journal bearing of claim 6, wherein, based on a cross-section perpendicular to the axial direction, the first foil encloses at least 360 degrees of the circumference of the rotation shaft when the rotation shaft is inserted in the hollow.

8. The airfoil journal bearing of claim 6, wherein, based on a cross-section perpendicular to the axial direction, the second foil encloses at least 180 to 360 degrees of the circumference of the rotation shaft when the rotation shaft is inserted in the hollow.

9. The airfoil journal bearing of claim 6, wherein, based on a cross-section perpendicular to the axial direction, a second insert part bent in a radial direction of the bearing housing is at an edge of the first foil, a first through hole and a second through hole are respectively formed through the first foil and the second foil in a radial direction of the bearing housing, and the second insert part is inserted, through the first through hole and the second through hole, into the insert slit.

10. The airfoil journal bearing of claim 1, wherein the airfoil comprises:

a first foil extending along the circumferential direction of the hollow and enclosing at least 180 to 360 degrees of the circumference of the rotation shaft when the rotation shaft is inserted in the hollow, and a pair of second foils respectively connected to opposite edges of the first foil parallel to the axial direction, extending in the circumferential direction of the hollow and enclosing at least 180 to 360 degrees of the circumference of the rotation shaft when the rotation shaft is inserted in the hollow, and including a plurality of elastic bumps having an uneven shape in the circumferential direction of the hollow, wherein the first foil and the pair of second foils are formed integrally as one body.

11. The airfoil journal bearing of claim 10, wherein, based on a cross-section perpendicular to the axial direction the airfoil encloses at least 360 degrees of the circumference of the rotation shaft when the rotation shaft is inserted in the hollow.

12. The airfoil journal bearing of claim 10, wherein the plurality of elastic bumps protrudes toward the inner surface of the bearing housing.

13. The airfoil journal bearing of claim 10, wherein, based on a cross-section perpendicular to the axial direction, the insert slit comprises a first insert slit and a second insert slit through the bearing housing in different radial directions of the bearing housing, and the insert part comprises a first insert part and a second insert part respectively at opposite edges of the airfoil in a circumferential direction of the airfoil, wherein the first insert part is engaged with a first part of the ring member through the first insert slit, and the second insert part is engaged with a second part of the ring member through the second insert slit.

14. The airfoil journal bearing of claim 1, wherein the airfoil comprises:

a top foil in the hollow and that, when the rotation shaft is inserted in the hollow, encloses a range of at least 180 to 360 degrees of the circumference of the rotation shaft;

a first bump foil in the hollow, enclosing a first part of the top foil in a circumferential direction of the hollow and including a plurality of elastic bumps having an uneven shape in the circumferential direction of the hollow; and a second bump foil in the hollow, enclosing, in the circumferential direction of the hollow, a second part of the top foil spaced, in the axial direction, apart from the first part of the top foil and including a plurality of elastic bumps having an uneven shape in the circumferential direction of the hollow, wherein the insert part is at each edge of the top foil, the first bump foil, and the second bump foil.

15. The airfoil journal bearing of claim 14, wherein, to an outer surface of the bearing housing, three ring members are connected, wherein the ring members are spaced, in the axial direction, apart from one another, and are respectively engaged with the insert parts of the first bump foil and the second bump foil.

16. An airfoil journal bearing comprising:

a bearing housing having an inner surface forming a hollow through the bearing housing so that a rotation shaft is insertable in the hollow and so that, when the rotation shaft is inserted in the hollow, an axial direction of the airfoil journal bearing is the same as a longitudinal direction of the rotation shaft and the hollow longitudinally extends in the axial direction;

an airfoil in the hollow and extending in a circumferential direction of the hollow so that, when the rotation shaft is inserted in the hollow, the airfoil encloses at least 180 to 360 degrees of a circumference of the rotation shaft and the airfoil receives pressure generated by rotation of the rotation shaft; and a ring member connected to the bearing housing and enclosing an outer surface of the bearing housing in a circumferential direction of the bearing housing, and configured to fix a position of the airfoil in the axial direction, wherein the bearing housing, based on a cross-section perpendicular to the axial direction, comprises an insert slit formed through the bearing housing from the inner surface of the bearing housing forming the hollow to the outer surface of the bearing housing, and at least some of the airfoil passes through the insert slit and is engaged with the ring member.

17. The airfoil journal bearing of claim 16, wherein the airfoil comprises:

based on a cross-section perpendicular to the axial direction, an insert part, of which an edge toward the circumferential direction of the hollow is bent toward a radial direction of the bearing housing, extending through the insert slit to the outer surface of the bearing housing, wherein the insert part includes an engagement part into which at least some of an outer surface of the ring member is inserted.

18. The airfoil journal bearing of claim 17, wherein the insert slit extends in the axial direction, ring members are spaced apart from one another and connected to the outer surface of the bearing housing, and the insert part includes engagement parts respectively engaged with the ring members.

19. The airfoil journal bearing of claim 16, wherein a seating groove is concavely formed in a circumferential direction of the bearing housing in the outer surface of the bearing housing so that the ring member is seated in the seating groove.

20. A mechanical device comprising:

a motor housing;

a motor inside the motor housing and including a rotation shaft;

an impeller connected to the rotation shaft;

an airfoil journal bearing rotatably supporting the rotation shaft; and a bearing seating part connected to the motor housing and including a seating space in which the airfoil journal bearing is seated, wherein the airfoil journal bearing comprises:

a bearing housing having an inner surface forming a hollow through the bearing housing into which the rotation shaft is inserted, an airfoil in the hollow, extending in a circumferential direction of the rotation shaft, and enclosing at least 180 to 360 degrees of a circumference of the rotation shaft, and receiving pressure generated by rotation of the rotation shaft, and a ring member connected to the bearing housing and enclosing an outer surface of the bearing housing in a circumferential direction of the bearing housing, wherein the bearing housing, based on a cross-section perpendicular to an axial direction of the rotation shaft, comprises an insert slit formed in a radial direction of the bearing housing through the bearing housing from the inner surface of the bearing housing forming the hollow to the outer surface of the bearing housing, the airfoil comprises an insert part bent from an edge of the airfoil in the circumferential direction of the rotation shaft and extending through the insert slit to the outer surface of the bearing housing, and an outer surface of the ring member is engaged with the insert part and configured to fix a position of the airfoil in an axial direction of the airfoil.

* * * * *